US012780986B2

(12) United States Patent
Kumar et al.

(10) Patent No.: US 12,780,986 B2
(45) Date of Patent: Nov. 3, 2026

(54) SCHIFF BASE INCORPORATED DOUBLE METAL CYANIDE CATALYST FOR THE PRODUCTION OF POLYETHER POLYOLS

(71) Applicant: Council of Scientific & Industrial Research, New Delhi (IN)

(72) Inventors: Umesh Kumar, Dehradun (IN); Akash Verma, Dehradun (IN); Bhawna Sharma, Dehradun (IN); Amod Kumar, Dehradun (IN); Swati, Dehradun (IN); Thangaraj Senthilkumar, Dehradun (IN); Sudip Kumar Ganguly, Dehradun (IN); Anjan Ray, Dehradun (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 774 days.

(21) Appl. No.: 18/305,077

(22) Filed: Apr. 21, 2023

(65) Prior Publication Data

US 2023/0340197 A1 Oct. 26, 2023

(30) Foreign Application Priority Data

Apr. 22, 2022 (IN) ............................ 202211024072

(51) Int. Cl.
*C08G 65/10* (2006.01)
*C08G 65/26* (2006.01)

(52) U.S. Cl.
CPC ......... *C08G 65/10* (2013.01); *C08G 65/2663* (2013.01)

(58) Field of Classification Search
CPC ............................ C08G 65/10; C08G 65/2663
See application file for complete search history.

(56) References Cited

U.S. PATENT DOCUMENTS 3,278,457 A 10/1966 Milgrom
3,278,458 A 10/1966 Belner
3,278,459 A 10/1966 Herold
3,404,109 A 10/1968 Milgrom
3,427,256 A 2/1969 Milgrom
3,427,334 A 2/1969 Belner et al.
3,829,505 A 8/1974 Robert et al.
3,900,518 A 8/1975 Milgrom
3,941,849 A 3/1976 Herold
4,239,879 A 12/1980 Fabris et al.
4,242,490 A 12/1980 Emerson et al.
4,355,188 A 10/1982 Herold et al.
4,472,560 A 9/1984 Kuyper et al.
4,477,589 A 10/1984 van der Hulst et al.
4,985,491 A 1/1991 Reisch
5,032,671 A 7/1991 Harper
5,158,922 A 10/1992 Hinney et al.
5,470,813 A 11/1995 Le-Khac
5,482,908 A 1/1996 Le-Khac
5,627,122 A 5/1997 Le-Khac et al.
5,712,216 A 1/1998 Le-Khac et al.
5,731,407 A 3/1998 Le-Khac
5,789,626 A 8/1998 Le-Khac
5,900,384 A 5/1999 Soltani-Ahmadi et al.
6,018,017 A 1/2000 Le-Khac
6,391,820 B1 * 5/2002 Ooms ...................... B01J 27/26 528/421
6,627,576 B2 9/2003 Kayoko et al.
8,680,002 B2 3/2014 Ahn et al.
11,898,007 B2 * 2/2024 Kumar .................... C07F 15/06
2003/0100801 A1 5/2003 Toyota et al.
2022/0259374 A1 8/2022 Kumar et al.

FOREIGN PATENT DOCUMENTS

EP 0892002 B1 3/2002
EP 1288244 A1 3/2003
EP 0383333 A1 9/2015
WO 199914258 A1 3/1999

* cited by examiner

*Primary Examiner* — Rabon A Sergent
(74) *Attorney, Agent, or Firm* — DINSMORE & SHOHL LLP

(57) ABSTRACT

A double metal cyanide [DMC] catalyst and a method for the synthesis thereof at room temperature is disclosed herein. Various Schiff bases are incorporated as organic complexing agents in the DMC catalysts. The catalysts of the present invention are highly active for the ring opening polymerization (ROP) of epoxides in the presence of different H-functional initiators to produce polyether polyols (PEPO) with a wide range of average molecular weight ($M_w$) and polydispersity index (PDI).

12 Claims, 16 Drawing Sheets

$^1H$ NMR

DEPT-135 NMR

SCHIFF BASE INCORPORATED DOUBLE METAL CYANIDE CATALYST FOR THE PRODUCTION OF POLYETHER POLYOLS

CROSS-REFERENCES TO RELATED APPLICATIONS

This application claims benefit of priority under 35 U.S.C. § 119(a)-(d) to Indian Patent Application No. 202211024072, filed Apr. 22, 2022, which is incorporated herein by reference in its entirety.

TECHNICAL FIELD

The present disclosure relates to Schiff base incorporated solid double metal cyanide catalyst. Particularly, the present disclosure relates to the synthesis of double metal cyanide (DMC) catalysts using Schiff bases as organic complexing agents for the production of the polyether polyols (PEPO) with controlled molecular weight. More particularly, the present disclosure relates to the use of active DMC catalysts to attain high yield of PEPO using low catalyst amount over a wide range of initiators with varying molecular weight in our reaction system. The method uniquely allows the DMC catalyst, initiator, and monomer to initiate the ring opening polymerization (ROP) reaction and produce controlled molecular weight PEPO with high yield.

BACKGROUND

DMC catalysts are generally reported to be active for the ring opening polymerization (ROP) of heterocyclic monomers such as epoxides, including ethylene oxide (EO), propylene oxide (PO), etc., for the production of PEPO. DMC catalysts are employed for the preparation of PEPO from PO (U.S. Pat. Nos. 3,404,109, 3,829,505, 3,900,518, 3,941,849, 4,355,188, 5,032,671, and 4,472,560). These catalysts are generally recognized to be superior to traditional caustic (KOH) catalysts to prepare PEPO for utilization in adhesives, coatings, elastomers, polyurethane foams, and sealants; due to low level of unsaturation and higher functionality of PEPO (U.S. Pat. Nos. 4,239,879, 4,242,490, and 4,985,491.) Conventional DMC catalyst is generally prepared by reacting aqueous solutions of metal halide salts and metal cyanide salts in the presence of an organic complexing agent to form the DMC complexes.

DMC catalyst was first prepared by General Tire (U.S. Pat. Nos. 3,278,459, 3,404,109, 3,278,458, 3,278,457) in 1960's to produce PEPO followed by improvement by companies like ARCO (U.S. Pat. Nos. 5,900,384, 5,158,922, 5,470,813, 5,482,908, 5,627,122, 5,712,216, 5,789,626, WO 9,914,258, EP 0,892,002 B1), Shell (U.S. Pat. No. 4,477,589), Asahi Glass (EP 0383333A1, US 2003/0100801A1, U.S. Pat. No. 6,627,576B2, EP 1,288,244A1) in the 1980's. In contrast to the previously established KOH catalyzed method to produce PEPO, the General Tire led with the approach to use DMC catalysts for the production of PEPO with low unsaturation and "true" hydroxyl functionality. Furthermore, DMC catalyst enables the ROP of epoxide and shows better activity for PEPO in terms of low unsaturation (i.e., low monol content) and narrow PDI than the KOH catalysis method (U.S. Pat. No. 5,470,813).

The specialty of the DMC catalyst is that it can be allowed at a lower dosage (less than 100 ppm of the finished polyols) for the polymerization reaction, and it takes less time (also known as induction time for the activation of the catalyst), for the completion of the reaction as compared to the single metal-based catalyst (KOH). Also, these catalysts are well known to produce PEPO with a low level of unsaturation, hydroxyl number, and a narrow PDI over a broad range of PEPO molecular weight. So far, DMC catalysts are generally recognized as superior to the base-catalyzed polymerization reaction traditionally used in the polymer industry.

The DMC catalyst can be used to make many polymer products such as PEPO, polyester polyols, polycarbonate polyether polyols, polycarbonate polyols, and polyetherester polyols. These polyols can further be useful in various polymeric material production, including polyurethane coating, elastomers, foams, sealants, and adhesives. The organic complexing agents are an integral part of the DMC catalysts. An organic complexing agent (low molecular weight), typically ether or alcohol or other functional/electron donating group containing agent, is preferably introduced to the DMC during its synthesis in order to enhance the activity of the DMC catalyst. In one common preparation, DMC catalyst is made by mixing metal halide salt (zinc chloride) and metal cyanide salt (potassium hexacyanocobaltate) homogeneously in the presence of an organic complexing agent (glyme) followed by washing/centrifugation with aqueous glyme solution.

The active DMC catalyst is obtained with the following general formula (I):

$$Zn_3[Co(CN)_6]_2 \cdot xZnCl_2 \cdot yH_2O \cdot z\text{Glyme} \qquad (I)$$

Organic complexing agents of molecular weight less than 500 are most preferable for the preparation of DMC catalyst. Water solubility is also another consideration for the choice of the complexing agent (U.S. Pat. Nos. 4,477,589, 3,829,505, and 5,158,922). The other low molecular weight organic complexing agents such as alcohols, esters, ketones, amides, urea, and similar (U.S. Pat. Nos. 3,427,256, 3,427,334, 3,278,459) can be used to activate the DMC catalyst for ROP of epoxides. Alcohols or ether groups present in the complexing agent with the DMC favorably enhance the activity of the catalyst for epoxide polymerization (U.S. Pat. Nos. 3,427,256, 3,829,505, and 5,158,922). The other co-complexing agents, such as PEPO, have also been incorporated in producing the DMC complex to increase the activity of the catalyst (U.S. Pat. Nos. 8,680,002, 5,482,908). Other polyols can also be used as a co-complexing agent in producing the DMC catalyst, but DMC catalyzed PEPO are more preferred to use as a co-complexing agent to enhance the catalytic activity and are amorphous in nature, confirmed by X-Ray diffraction (XRD) analysis (U.S. Pat. No. 5,482,908). DMC catalysts prepared in the absence of complexing agents are proved to have low activity or no activity at all for epoxide polymerization due to its highly crystalline nature (U.S. Pat. Nos. 5,731,407, 6,018,017, 5,470,813).

DMC catalysts have exceptional activity for the epoxide polymerization. However, DMC catalysts normally require an "induction" period for the initiation of the polymerization reaction, which means catalyst does not initiate polymerization right after the addition of an initiator and epoxide to it; instead, DMC catalyst needs to be activated with a tiny proportion of the epoxide and initiator before it becomes safer and appropriate to continuously add the remaining epoxides to the system. The induction period of one hour or more costs more in terms of increased cycle time for producing PEPO facility. Therefore, a highly active improved DMC catalyst with a shorter induction period during the polymerization reaction is desirable for improving the productivity as well as reducing the process cost. Moreover, it would allow for a safer and productive process for PEPO production. In addition, the synthesis of PEPO with low unsaturation, in other words, better stability, along with low hydroxyl number, are desirable features of the DMC catalyst.

In the present work, Schiff bases incorporated DMC catalysts are reported and proven to be active than previously reported work, wherein EDTA was chosen as a novel CA (Application no.—202111006129) for the synthesis of DMC catalysts. Herein, Schiff base exhibits the vital role as a flexi-dentate ligand by coordination to transition metal ions via either N atom of the azomethine group (C═N) or O atom of the de-protonated phenolic group. The designed Schiff base organic complexing agents have more than two chelating functional groups. The Schiff base is a multidentate organic complexing agent with both valence and coordination bonding sites and makes a stable complex.

The stable metal complex of Schiff base with Zn, along with coordination with two CN of $Fe(CN)_6$, makes its coordination sphere as distorted square planer geometry. The Zn complex has two available axial positions for the interaction of reactant and to have improvised catalytic activities. Therefore, in the present disclosure, these characteristics of CA, which have not been explored earlier, assisted in synthesizing the DMC catalyst. Hence an investigation is carried out to study the interaction of the Schiff base ligands as CA for the catalytic activity of the DMC catalysts. Schiff base incorporated DMC catalyst, being a small chain molecule as compared to EDTA based DMC catalyst showed high activity towards ROP of PO in terms of using DMC catalyst at low concentration level (200 ppm). Also, the present method is a single-step process for ROP reaction, which excluded the need to inject the liquid (PO) externally into the system.

The main object of the present disclosure is to provide Schiff base incorporated double metal cyanide [DMC] catalyst.

Another object of the present disclosure is to provide a method for the synthesis of DMC catalyst.

Yet another object of the present disclosure is to provide a method for the room temperature synthesis of zinc-cobalt based DMC catalysts using various Schiff bases as organic complexing agents in the catalytic system.

Yet another object of the present disclosure is to produce various molecular weight ranges PEPO with low PDI and hydroxyl number using DMC catalysts in a batch reactor.

Yet another object of the present disclosure is to use different molecular weight range initiators including ethylene glycol (EG), dipropylene glycol (DPG), neopentyl glycol (NPG), 1,3-butanediol (1,3-BD), 1,4-butanediol (1,4-BD), glycerol, polyethylene glycol (PEG) of different molecular weight including PEG-200, PEG-400, PEG-600, PEG-2000 and EO-PO copolymer polyol.

Still another object of the present disclosure is to optimize reaction conditions, including reaction time, catalyst amount, reaction temperature, reactor pressure, PO to initiator ratio, and PO injection interval time on ROP of PO to produce >90% yield of PEPO.

SUMMARY

Figure 1A:
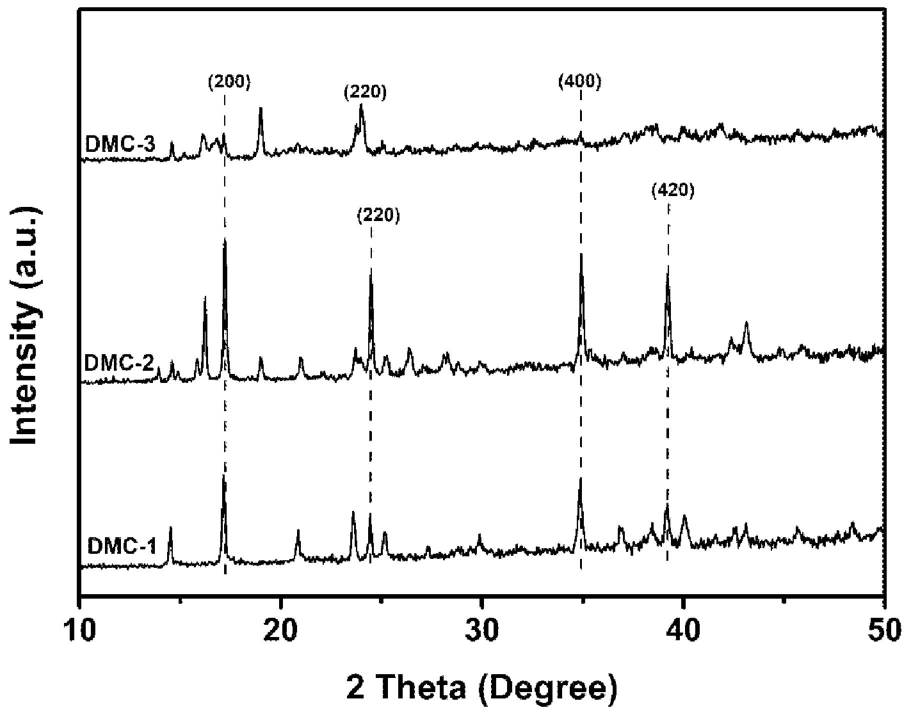
FIGS. 1A, 1*i*, and 1C represent PXRD spectra of the synthesized DMC catalysts (DMC-1 to DMC-9)

Accordingly, the present disclosure provides a double metal cyanide [DMC] catalyst comprising:

(a) 35 to 90 wt % double metal cyanide [DMC] complex;

(b) 10 to 65 wt % an organic complexing agent.

In an embodiment of the present disclosure, DMC complex is selected from the group consisting of zinc(II) hexacyanocobaltate(III), zinc(II) hexacyanoferrate(II), zinc(II) hexacyanoferrate(III), cobalt(II) hexacyanoferrate(III), manganese(II) hexacyanoferrate(III), nickel(II) hexacyanoferrate(III), manganese(II) hexacyanocobaltate(III), and nickel(II) hexacyanocobaltate.

In another embodiment of the present disclosure, organic complexing agent is Schiff bases selected from the group consisting of i. 2-(((3-hydroxypropyl)imino)methyl)phenol;
ii. 2,2'-((ethane-1,2-diylbis(azanylylidene))bis(methanylylidene))diphenol;
iii. 2-(((2-hydroxyethyl)imino)methyl)phenol;
iv. 3-(benzylideneamino)propan-1-ol;
v. 2-(benzylideneamino)ethanol;
vi. $N^1$,$N^2$-dibenzylideneethane-1,2-diamine;
vii. 3-((2-methoxybenzylidene)amino)propan-1-ol;
viii. 2-((2-methoxybenzylidene)amino)ethanol or;
ix. $N^1$,$N^2$-bis(2-methoxybenzylidene)ethane-1,2-diamine.

In yet another embodiment of the present disclosure, said DMC catalyst is selected from the group consisting of:

i. zinchexacyanocobaltate/2-(((3-hydroxypropyl)imino)methyl)phenol;
ii. zinchexacyanocobaltate/2,2'-((ethane-1,2 diylbis(azanylylidene))bis(methanylylidene))diphenol;
iii. zinchexacyanocobaltate/2-(((2-hydroxyethyl)imino)methyl)phenol;
iv. zinchexacyanocobaltate/3-(benzylideneamino)propan-1-ol;
v. zinchexacyanocobaltate/2-(benzylideneamino)ethanol;
vi. zinchexacyanocobaltate/$N^1$,$N^2$-dibenzylideneethane-1,2-diamine;
vii. zinchexacyanocobaltate/3-((2-methoxybenzylidene)amino)propan-1-ol;
viii. zinchexacyanocobaltate/2-((2-methoxybenzylidene)amino)ethanol;
ix. zinchexacyanocobaltate/$N^1$,$N^2$-bis(2-methoxybenzylidene)ethane-1,2-diamine.

In yet another embodiment, present disclosure provides a process for the preparation of DMC catalyst comprising the steps of.

(a) mixing 10 to 65 wt % organic complexing agents in a solvent to obtain a first solution;

(b) adding the first solution as obtained in step (a) in an aqueous solution of metal salts of formula $M(A)_n$ followed by homogenizing for a period in the range of 5 to 30 minutes at room temperature in the range of 20 to 35° C. to obtain a second solution; wherein M is selected from the group consisting of Zn(II), Fe(II), Pb(II), Mo(IV), Al(III), Mn(II), V(IV), V(V), W(IV), W(VI), Co(II), Sn(II), Cu(II), Cr(III), Ni(II); A is an anion selected from the group consisting of halides, sulfates, hydroxides, cyanides, oxalates, isocyanates, thiocyanates, isothiocyanates, carboxylates, and nitrates;

n is selected from 1 to 3;

(c) adding an aqueous solution of metal cyanide salt of formula $(A^*)_xM^*(CN)_y$ to the second solution as obtained in step (b) followed by homogenizing for a period in the range of 30 to 40 minutes to obtain a third solution;

wherein A* is selected from an alkali metal ion or alkaline earth metal ion;

M* is selected from the group consisting of Fe(II), Fe(III), Co(II), Ir(III), Ni(II), Rh(III), Ru(II), Co(III), Cr(II), Cr(III), Mn(II), Mn(III), V(IV), and V(V).

Both x and y are integers greater than or equal to 1, and the sum of the charges of x and y balances the charge of M*.

(d) adding a solution of PEG ($M_w$=200 to 400) and a solvent to the third solution as obtained in step (c) followed by homogenizing for a period in the range of 5 to 30 min and centrifuging at 6000 rpm for 10 min to obtain the solid cake material (e) mixing the solid cake material as obtained in step (d) with polyethylene glycol (PEG) in a solvent and homogenizing this mixture for a period in the range of 30 to 40 min, washing and drying to obtain the DMC catalyst.

In yet another embodiment of the present disclosure, solvent used in step (d) and (e) is selected from tetrahydrofuran [THF] or Acetonitrile [ACN].

In yet another embodiment, present disclosure provides a single step process for the ring opening polymerization (ROP) of propylene oxide [PO] with initiators of $M_w$ ranging between 62 to 3000 g/mol to produce polyether polyols [PEPO] using DMC catalyst comprising the steps of:

(a) taking the DMC catalyst, initiator, and propylene oxide [PO] in a Teflon lined reactor and running the ROP reaction at temperature in the range of 8° C. to 150° C., pressure in the range of 1 bar to 20 bar for a time period in the range of 12 to 36 h to obtain a mixture;

(b) cooling down the reactor to room temperature in the range of 8 to 40° C. after completion of reaction;

(c) separating unreacted PO from produced PEPO followed by vacuum drying at temperature in the range of 40° C. to 70° C. to obtain 4.7 to 98.1% PEPO.

In yet another embodiment of the present disclosure, PO to initiator ratio is ranging between 22:1 to 4400:1.

In yet another embodiment of the present disclosure, the initiators used is selected from the group consisting of Ethylene glycol [EG], dipropylene glycol [DPG], neopentyl glycol [NPG], 1,3-butanediol [1,3-BD], 1,4-butanediol [1,4-BD], glycerol, PEG ($M_w$=200 to 2000) or EO-PO copolymer polyol.

In yet another embodiment of the present disclosure, PEPO produced have molecular weight in the range of 450 g/mol to 141224 g/mol with less PDI (<2.85) and viscosities is in the range of 13.1 to 20524 $mm^2/s$.

In yet another embodiment of the present disclosure, synthesized Schiff bases are used as CAs in DMC catalysts.

In still another embodiment of the present disclosure, the effect of synthesized DMC catalysts is scrutinized on ROP of PO for the synthesis of PEPO.

In an embodiment of the present disclosure, the effect of low, as well as high molecular weight initiators such as EG, DPG, NPG, 1,3-BD, 1,4-BD, glycerol, PEG of different molecular weight including PEG-200, PEG-400, PEG-600, PEG-2000, and EO-PO copolymer polyol, is scrutinized.

In another embodiment of the present disclosure, the effect of various reaction parameters such as reaction time, catalyst amount, reaction temperature, reactor pressure, PO to initiator ratio, and PO injection interval time on the ROP of PO is scrutinized.

In yet another embodiment of the present disclosure, the yield of the produced PEPO is greater than 90% with a wide range of $M_w$, viscosity, OH number, and low PDI.

In yet another embodiment of the present disclosure, DMC catalyst in the presence of CA shows high activity towards ROP of PO as compared to the catalyst in the absence of the CA.

In still another embodiment of the present disclosure, low concentration (~200 ppm) of the DMC catalyst is required to produce PEPO with high yield.

In yet another embodiment of the present disclosure, PEPO are produced with a maximum yield of 98.1%, using 0.0009 as the catalyst to feed ratio.

In yet another embodiment, present disclosure provides a two-step process, wherein PEPO are produced with 88.8% yield, using 0.0001 as the catalyst to feed ratio by injecting PO externally to the system.

In yet another embodiment of the present disclosure, catalyst to feed ratio is ranging between 0.001 to 0.0001.

DETAILED DESCRIPTION

Embodiments of the present disclosure provide Schiff bases incorporated double metal cyanide catalysts to produce polyether polyols, which comprises a method for the synthesis of the DMC catalysts at room temperature i.e., 8 to 40° C.

Zinc and cobalt are chosen as metals to synthesize DMC catalysts.

Various synthesized Schiff bases are chosen as organic complexing agents existing in various compositions to check their effect on the catalytic activity of DMC catalysts.

Schiff bases are synthesized at an elevated temperature, wherein steps of the synthesis include:

(a) homogenizing aromatic aldehydes and different amines at an elevated temperature.

(b) removal of the solvent by vacuum drying after the formation of the Schiff bases.

DMC catalyst has gained importance over single metal-based catalyst (e.g., KOH) for the production of PEPO, polyester polyols, and polycarbonate polyols due to its high activity as compared to the single metal-based catalyst. DMC catalyst is generally prepared by reacting aqueous solutions of metal salt and metal cyanide salts in the presence of an organic complexing agent wherein water-soluble metal salts contain the general formula of $M(A)_n$ where M is selected from the group of metals consisting of Zn(II), Fe(II), Pb(II), Mo(IV), Al(III), W(IV), W(VI), Co(II), Sn(II), Cu(II), Cr(III), Mn(II), V(IV), V(V), and Ni(II). Most preferably, M is selected from the group of metals consisting of Zn(II), Co(II), Fe(II), Fe(III), Cr(III), and Ni(II). A is generally an anion selected from the group consisting of halides, sulfates, hydroxides, cyanides, oxalates, isocyanates, thiocyanates, isothiocyanates, carboxylates, and nitrates. Here "n" may vary from 1 to 3 for satisfying the valency of M. Examples of suitable metal salts include, but are not limited to, zinc(II)chloride, zinc(II)bromide, zinc(II) acetate, zinc acetylacetonate, zinc(II)benzoate, zinc(II)nitrate, iron(II)sulfate, iron(II)bromide, cobalt(II)chloride, cobalt(II)thiocyanate, nickel(II)formate, nickel(II)nitrate, and the like, and mixtures thereof. The metal cyanide salts of this disclosure to make DMC complexes have the general formula $(A^*)_xM^*(CN)_y$ where A* is an alkali metal ion or alkaline earth metal ion and M* is selected from the group of metals consisting of Fe(II), Fe(III), Co(II), Ir(III), Ni(II), Rh(III), Ru(II), Co(III), Cr(II), Cr(III), Mn(II), Mn(III), V(IV), and V(V). More preferably, M* is selected from the group of metals consisting of Co(II), Co(III), Fe(II), Fe(III), Cr(III), Ir(III), and Ni(II). In the formula, A is an anion selected from the group consisting of halides, hydroxides, sulfates, carbonates, cyanides, oxalates, thiocyanates, isocyanates, isothiocyanates, carboxylates, and nitrates. All x, and y are the integers greater than or equal to 1; the sum of the charges of x, and y balances the charge of M*.

Examples of suitable water-soluble metal cyanide salts are potassium hexacyanocobaltate (III), potassium hexacyanoferrate (II), potassium hexacyanoferrate (III), calcium hexacyanocobaltate (III), and lithium hexacyanocobaltate (III). In embodiments, potassium (K) is selected as an alkali metal in metal cyanide salt, which is considered as the most effective and preferred alkali metal for the synthesis of highly active DMC catalysts. Co(II) was chosen as a metal centre to synthesize DMC catalysts. In embodiments, the developed DMC catalysts are based on $Zn_3[Co(CN)_6]_2$.

The key organic linker of embodiments herein is "Schiff base" used as an organic complexing agent in the preparation of DMC catalyst. The water solubility of the organic complexing agent has also been an important factor in incorporating functionalized polymers to produce and precipitate the DMC catalyst. The preferred organic complexing agents are generally the functional groups that contain oxygen, nitrogen, sulfur, phosphorus, or halogen, which has good water solubility and therefore miscible with the aqueous solution of metal salts. The organic solvents such as tetrahydrofuran (THF), acetone, tert-butyl alcohol (t-BuOH), acetonitrile (ACN), and like are used and preferred as a solvent to form the DMC catalyst.

PEPO is generally produced by the ROP of epoxides such as propylene oxide, styrene oxide, isobutylene oxide, etc., in the presence of active hydrogen atom compounds such as EG, DPG, etc. and a highly active DMC catalyst. Polyols are classified into many types, such as PEPO, polyester polyols, polycarbonate polyols. Polyols and isocyanates are being used as two major components for Polyurethane (PU) formulations, among which PEPO, polyester polyols have been attractive materials in PU formulations for many decades. These polyols remain the most commonly used polyols. The major number of optimized PEPO and polyester polyols, having different combinations of behavior during the manufacturing process and performance characteristics of manufactured PU materials, are available from various manufacturers. Depending upon the properties and quality of PEPO, the PU can be prepared for various applications.

Polyester polyols are generally prepared by polycondensation reaction between multifunctional carboxylic acids and polyhydroxy compounds. For decades, PEPO have been made using conventional alkaline metal-based catalyst such as potassium hydroxide. The chain-transfer reaction, also known as abstraction reaction due to the abstraction of methyl proton, can hardly be avoided during the base-catalyzed (single metal-based catalyst) polymerization of PO, which not only enhances the unsaturation of the PEPO product but also limits the degree of polymerization.

During the ROP of epoxides, a side reaction of the base in polymerization is the isomerization reaction such as PO isomerizes to allyl alcohol, and as a result, vinyl-terminated monofunctional polyols are formed. This type of monofunctional polyols is known as monols. The final products obtained from monols have a detrimental effect on the mechanical properties of the polymer. The monol formation in the polyols can be suppressed by using a DMC catalyst, e.g., zinc (II) hexacyanocobaltate (III), zinc hexacyanoferrate (II), and zinc hexacyanoferrate (III), nickel (II) hexacyanoferrate (II). This type of catalyst is known as the DMC catalyst, which is the focus of our present work, justifying the reason to produce PEPO using DMC catalysts.

In embodiments, room temperature synthesized Zn and Co based DMC catalysts $\{Zn_3[Co(CN)_6]_2\}$ were prepared using Schiff bases as organic complexing agents. Schiff bases were prepared by homogenizing different aldehydes and amines to use these as organic CA in DMC catalytic system (Example 1-9), where Schiff base helps to have enhanced catalytic activity for ROP in the DMC catalyst system. These DMC catalysts were further used to check their effect on the ROP of PO to produce PEPO. Also, various reaction parameters such as reaction time, catalyst amount, reaction temperature, reactor pressure, monomer (PO) to initiator (M/I) ratio, and PO injection interval time were optimized for the production of various molecular weight range based PEPO. Furthermore, the effect of different initiators such as EG, DPG, NPG, 1,3-BD, 1,4-BD, glycerol, PEG-200, PEG-400, PEG-600, PEG-2000, and EO-PO copolymer polyol was studied to control $M_w$, PDI, OH number of PEPO under a wide range of reaction conditions.

EXAMPLES

The following examples are given by the way of illustration of various embodiments and, therefore, should not be construed to limit the scope of the invention described herein, or the appended claims.

Example 1

Preparation of Schiff Base (S.B-1)

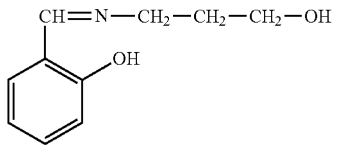

2-(((3-hydroxypropyl)imino)methyl)phenol

This example illustrates the preparation of Schiff base (S.B-1) (organic complexing agent), wherein 3-amino-1-propanol was chosen as an aliphatic amine and salicylaldehyde as a carbonyl compound. In preparation of S.B-1, 6.1 g of salicylaldehyde was mixed with 20 mL of methanol in a beaker and labeled as solution 1. 3.75 g of 3-amino-1-propanol was dissolved in 20 mL of methanol in a round bottom (RB) flask and labeled as solution 2. Now, solution 1 was poured into solution 2 slowly dropwise and homogenized for 3 h at 70° C. and 500 rpm. The color of the reaction mixture changed to yellow with the formation of a Schiff base. Then, on the removal of the solvent (methanol), a thick viscous liquid was obtained, which was dried under vacuum at 70° C. This Schiff base product was labeled as S.B-1 and stored under dry conditions for its further use as CA for the synthesis of DMC catalyst. The yield of the S.B-1 product was 88.6%.

Example 2

Preparation of Schiff Base (S.B-2)

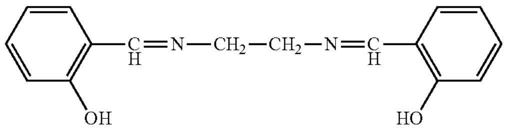

2,2'-((ethane-1,2-diylbis (azanylylidene))bis(methanylylidene))diphenol

This example illustrates the preparation of Schiff base (S.B-2), wherein ethylenediamine was chosen as an aliphatic amine and salicylaldehyde as a carbonyl compound. In preparation of S.B-2, 8.13 g of salicylaldehyde was mixed with 20 mL of methanol in a beaker and labeled as solution 1. 2.0 g of ethylenediamine was dissolved in 20 mL of methanol in RB flask and labeled as solution 2. Now, solution 1 was poured into solution 2 slowly dropwise and homogenized for 3 h at 50° C. and 500 rpm. The color of the reaction mixture changed to yellow with the formation of a Schiff base. Then, on the removal of the solvent (methanol), a thick viscous liquid was obtained, which was dried under vacuum at 70° C. The Schiff base product was labeled as S.B-2 and stored under dry conditions for its further use as CA for the synthesis of DMC catalyst. The yield of the S.B-2 product was 91.5%.

Example 3

Preparation of Schiff Base (S.B-3)

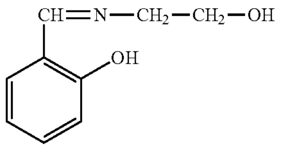

2-(((2-hydroxyethyl)imino)methyl)phenol

This example illustrates the preparation of Schiff base (S.B-3), wherein ethanolamine was chosen as an aliphatic amine and salicylaldehyde as a carbonyl compound. In preparation of S.B-3, 6.10 g of salicylaldehyde was mixed with 20 mL of methanol in a beaker and labeled as solution 1. 2.0 g of ethanolamine was dissolved in 20 mL of methanol in RB flask and labeled as solution 2. Now, solution 1 was poured into solution 2 slowly dropwise and homogenized for 3 h at 70° C. and 500 rpm. The color of the reaction mixture was changed to yellow with the formation of a Schiff base. Then, on the removal of the solvent (methanol), a thick viscous liquid was obtained, which was dried under vacuum at 70° C. The Schiff base product was labeled as S.B-3 and stored under dry conditions for its further use as CA for the synthesis of DMC catalyst. The yield of the S.B-3 product was 89.9%.

Example 4

Preparation of Schiff Base (S.B-4)

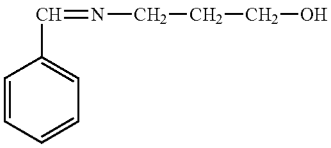

3-(benzylideneamino)propan-1-ol

This example illustrates the preparation of Schiff base (S.B-4), wherein 3-amino-1-propanol was chosen as an aliphatic amine and benzaldehyde as a carbonyl compound. In preparation of S.B-4, 5.30 g of benzaldehyde was mixed with 20 mL of methanol in a beaker and labeled as solution 1. 3.75 g of 3-amino-1-propanol was dissolved in 20 mL of methanol in RB flask and labeled as solution 2. Now, solution 1 was poured into solution 2 slowly dropwise and homogenized for 4 h at 70° C. and 500 rpm. The color of the reaction mixture was changed to yellow with the formation of a Schiff base. Then, on the removal of the solvent (methanol), a thick viscous liquid was obtained, which was dried under vacuum at 70° C. The Schiff base product was labeled as S.B-4 and stored under dry conditions for its further use as CA for the synthesis of DMC catalyst. The yield of the S.B-4 product was 94.7%.

Example 5

Preparation of Schiff Base (S.B-5)

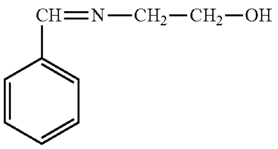

2-(benzylideneamino)ethanol

This example illustrates the preparation of Schiff base (S.B-5), wherein ethanolamine was chosen as an aliphatic amine and benzaldehyde as a carbonyl compound. In preparation of S.B-5, 3.05 g of ethanolamine was dissolved in 20 mL of methanol in RB flask and labeled as solution 2. Now, solution 1 was poured in solution 2 slowly dropwise and homogenized for 4 h at 70° C. and 500 rpm. The color of the reaction mixture was changed to orange with the formation of Schiff. Then, after removing the solvent (methanol), a thick viscous liquid was obtained, which was dried under vacuum at 70° C. The Schiff base product was labeled as S.B-5 and stored under dry conditions for its further use as CA for the synthesis of DMC catalyst. The yield of the S.B-5 product was 53.4%.

Example 6

Preparation of Schiff Base (S.B-6)

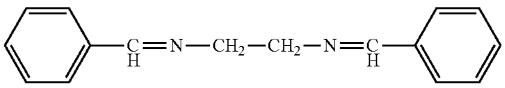

$N^1,N^2$-dibenzylideneethane-1,2-diamine

This example illustrates the preparation of Schiff base (S.B-6), wherein ethylenediamine was chosen as an aliphatic amine and benzaldehyde as a carbonyl compound. In preparation of S.B-6, 7.06 g of benzaldehyde was mixed with 20 mL of methanol in a beaker and labeled as solution 1. 2.0 g of ethylenediamine was dissolved in 20 mL of methanol in RB flask and labeled as solution 2. Now, solution 1 was poured into solution 2 slowly dropwise and homogenized for 4 h at 70° C. and 500 rpm. The color of the reaction mixture was changed to yellow with the formation of a Schiff base. Then, after removing the solvent (methanol), a thick viscous liquid was obtained, which was dried under vacuum at 70° C. The Schiff base product was labeled as S.B-6 and stored under dry conditions for its further use as CA for the synthesis of DMC catalyst. The yield of the S.B-6 product was 94.7%.

Example 7

Preparation of Schiff Base (S.B-7)

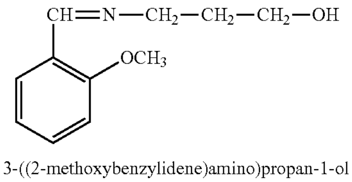 [SMILES: COc1ccccc1C=NCCCO]

3-((2-methoxybenzylidene)amino)propan-1-ol

This example illustrates the preparation of Schiff base (S.B-7), wherein 3-amino-1-propanol was chosen as an aliphatic amine and o-anisaldehyde as a carbonyl compound. In preparation of S.B-7, 6.80 g of o-anisaldehyde was mixed with 20 mL of methanol in a beaker and labeled as solution 1. 3.75 g of 3-amino-1-propanol was dissolved in 20 mL of methanol in RB flask and labeled as solution 2. Now, solution 1 was poured into solution 2 slowly dropwise and homogenized for 4 h at 70° C. and 500 rpm. The color of the reaction mixture was changed to brown with the formation of a Schiff base. Then, on the removal of the solvent (methanol), a thick viscous liquid was obtained, which was dried under vacuum at 70° C. The Schiff base product was labeled as S.B-7 and stored under dry conditions for its further use as CA for the synthesis of DMC catalyst. The yield of the S.B-7 product was 83.7%.

Example 8

Preparation of Schiff Base (S.B-8)

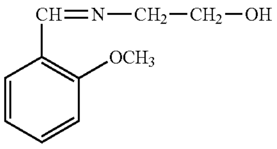

2-((2-methoxybenzylidene)amino)ethanol

This example illustrates the preparation of Schiff base (S.B-8), wherein ethylenediamine was chosen as an aliphatic amine and o-anisaldehyde as a carbonyl compound. In preparation of S.B-8, 13.6 g of o-anisaldehyde was mixed with 20 mL of methanol in a beaker and labeled as solution 1. 2.0 g of ethylenediamine was dissolved in 20 mL of methanol in RB flask and labeled as solution 2. Now, solution 1 was poured into solution 2 slowly dropwise and homogenized for 4 h at 70° C. and 500 rpm. The color of the reaction mixture was changed to orange with the formation of a Schiff base. Then, after removing the solvent (methanol), a thick viscous liquid was obtained, which was dried under vacuum at 70° C. The Schiff base product was labeled as S.B-8 and stored under dry conditions for its further use as CA for the synthesis of DMC catalyst. The yield of the S.B-8 product was 90.9%.

Example 9

Preparation of Schiff Base (S.B-9)

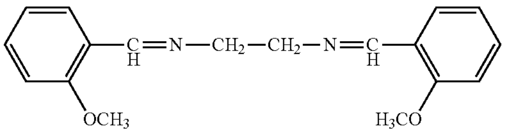

$N^1,N^2$-bis(2-methoxybenzylidene)ethane-1,2-diamine

This example illustrates the preparation of Schiff base (S.B-9), wherein ethanolamine was as an aliphatic amine and o-anisaldehyde as a carbonyl compound. In preparation of S.B-9, 5.30 g of o-anisaldehyde was mixed with 20 mL of methanol in a beaker and labeled as solution 1. 3.05 g of ethanolamine was dissolved in 20 mL of methanol in RB flask and labeled as solution 2. Now, solution 1 was poured into solution 2 slowly dropwise and homogenized for 18 h at 70° C. and 500 rpm. The color of the reaction mixture was changed to brown with the formation of a Schiff base. Then, on the removal of the solvent (methanol), a thick viscous liquid was obtained, which was dried under vacuum at 70° C. The Schiff base product was labeled as S.B-9 and stored under dry conditions for its further use as CA for the synthesis of DMC catalyst. The yield of the S.B-9 product was 39.0%.

Example 10

This example illustrates the preparation of DMC catalyst (DMC-1) using Schiff base (S.B-1) as an organic complexing agent. In the preparation of the DMC-1 catalyst, 12 g of zinc chloride was dissolved in 23 mL of de-ionized (DI) water in a beaker and labeled as solution 1. In the second beaker, 0.66 g of potassium hexacyanocobaltate was dissolved in 10 mL of DI water and labeled as solution 2. Similarly, 0.8 g of polyethylene glycol (PEG)-200 was dissolved in 0.2 mL of THF and 5 mL of DI water in a beaker and labeled as solution 3. 0.5 g of Schiff base (S.B-1) was dissolved in THF and added to solution 1. Then, it was homogenized for 10 min at room temperature. Solution 2 was then added to this homogenized solution 1. 40 mL water was additionally added to this mixture and homogenized for 35 min. Immediately, solution 3 was added to this mixture and further homogenized for 10 min. This mixture was centrifuged at 6000 rpm for 10 min to obtain the solid cake material. The mixture of 0.3 g of PEG-200 and 0.2 g of THF in 50 mL of DI water was added to the solid cake and homogenized for 30 min at room temperature. The resulting solid cake thus obtained was washed with DI water to remove all the uncomplexed ions and vacuum dried overnight at 70° C. The obtained catalyst was designated as DMC-1.

Powder X-Ray Diffraction (PXRD) of the solid DMC-1 catalyst showed broad signals of 2 theta value at 17.2°, 20.9°, 23.5°, 34.9°, and 39.2°. Brunauer-Emmett-Teller (BET) surface area of the DMC-1 catalyst is mentioned in Table 1.

Example 11

This example illustrates the preparation of DMC catalyst (DMC-2) using Schiff base (S.B-2) as an organic complexing agent. In preparation of DMC-2 catalyst, the procedure of example 10 was followed, except S.B-2 (1 g) was used instead of S.B-1. The final solid cake was isolated and dried as described in example 10, and this DMC catalyst was designated as DMC-2.

PXRD of this solid DMC-2 catalyst showed broad signals of 2 theta value at 17.1°, 20.9°, 24.4°, 34.8°, and 39.2°. BET surface area of the DMC-2 catalyst is mentioned in Table 1.

Example 12

This example illustrates the preparation of DMC catalyst (DMC-3) using Schiff base (S.B-3) as an organic complexing agent. In preparation of DMC-3 catalyst, the procedure of example 10 was followed, except S.B-3 (1 g) was used instead of S.B-1. The final solid cake was isolated and dried as described in example 10, and this DMC catalyst was designated as DMC-3.

PXRD of this solid DMC-3 catalyst showed broad signals of 2 theta value at 17.1°, 19.0°, 24.0°, 34.8°, and 38.6°. BET surface area of the DMC-3 catalyst is mentioned in Table 1.

Example 13

This example illustrates the preparation of DMC catalyst (DMC-4) using Schiff base (S.B-4) as an organic complexing agent. In preparation of DMC-4 catalyst, the procedure of example 10 was followed, except S.B-4 (1 g) was used instead of S.B-1. The final solid cake was isolated and dried as described in example 10, and this DMC catalyst was designated as DMC-4.

PXRD of this solid DMC-4 catalyst showed broad signals of 2 theta value at 17.2°, 21.0°, 23.7°, 34.9°, and 39.2°. BET surface area of the DMC-4 catalyst is mentioned in Table 1.

Example 14

This example illustrates the preparation of DMC catalyst (DMC-5) using Schiff base (S.B-5) as an organic complexing agent. In preparation of DMC-5 catalyst, the procedure of example 10 was followed, except S.B-5 (1 g) was used instead of S.B-1. The final solid cake was isolated and dried as described in example 10, and this DMC catalyst was designated as DMC-5.

PXRD of this solid DMC-5 catalyst showed broad signals of 2 theta value at 16.5°, 20.9°, 23.0°, 35.2°, and 39.7°. BET surface area of the DMC-5 catalyst is mentioned in Table 1.

Example 15

This example illustrates the preparation of DMC catalyst (DMC-6) using Schiff base (S.B-6) as an organic complexing agent. In preparation of DMC-6 catalyst, the procedure of example 10 was followed, except S.B-6 (1 g) was used instead of S.B-1. The final solid cake was isolated and dried as described in example 10, and this DMC catalyst was designated as DMC-6.

PXRD of this solid DMC-6 catalyst showed broad signals of 2 theta value at 17.2°, 21.0°, 23.7°, 34.9°, and 38.6°. BET surface area of the DMC-6 catalyst is mentioned in Table 1.

Example 16

This example illustrates the preparation of DMC catalyst (DMC-7) using Schiff base (S.B-7) as an organic complexing agent. In preparation of DMC-7 catalyst, the procedure of example 10 was followed, except S.B-7 (1 g) was used instead of S.B-7. The final solid cake was isolated and dried as described in example 10, and this DMC catalyst was designated as DMC-7.

PXRD of this solid DMC-7 catalyst showed broad signals of 2 theta value at 17.2°, 21.0°, 23.8°, 33.4°, and 37.8°. BET surface area of the DMC-7 catalyst is mentioned in Table 1.

Example 17

This example illustrates the preparation of DMC catalyst (DMC-8) using Schiff base (S.B-8) as an organic complexing agent. In preparation of DMC-8 catalyst, the procedure of example 10 was followed, except S.B-8 (1 g) was used instead of S.B-1. The final solid cake was isolated and dried as described in example 10, and this DMC catalyst was designated as DMC-8. PXRD of this solid DMC-8 catalyst showed broad signals of 2 theta value at 17.2°, 21.0°, 23.8°, 33.4°, and 37.8°. BET surface area of the DMC-8 catalyst is mentioned in Table 1.

Example 18

This example illustrates the preparation of DMC catalyst (DMC-9) using Schiff base (S.B-9) as an organic complexing agent. In preparation of DMC-9 catalyst, the procedure of example 10 was followed, except S.B-9 (1 g) was used instead of S.B-1. The final solid cake was isolated and dried as described in example 10, and this DMC catalyst was designated as DMC-9.

PXRD of this solid DMC-9 catalyst showed broad signals of 2 theta value at 17.2°, 21.0°, 23.8°, 33.4°, and 37.8°. BET surface area of the DMC-9 catalyst is mentioned in Table 1.

Figure 1B:
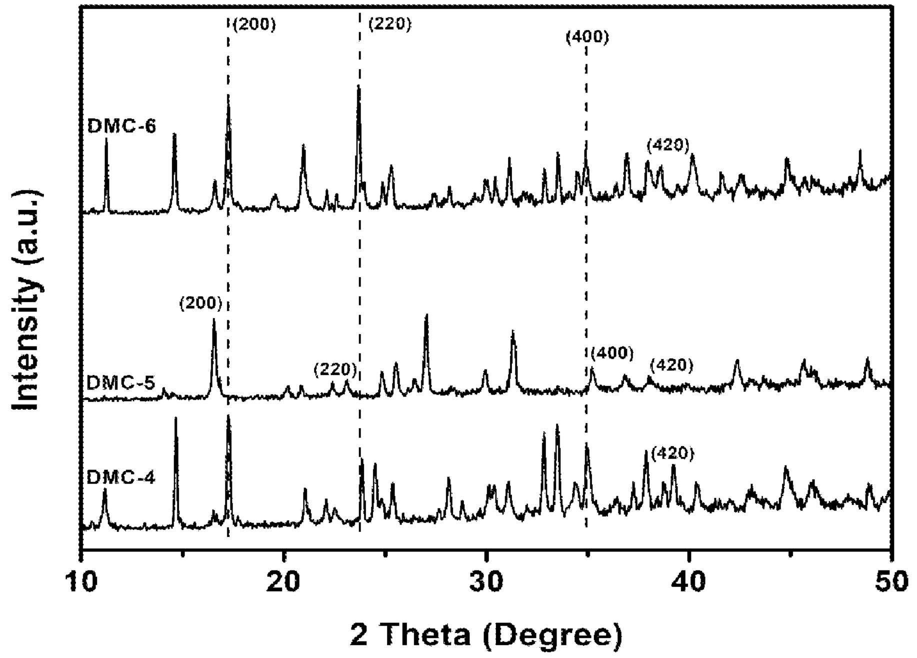
Figure 1C:
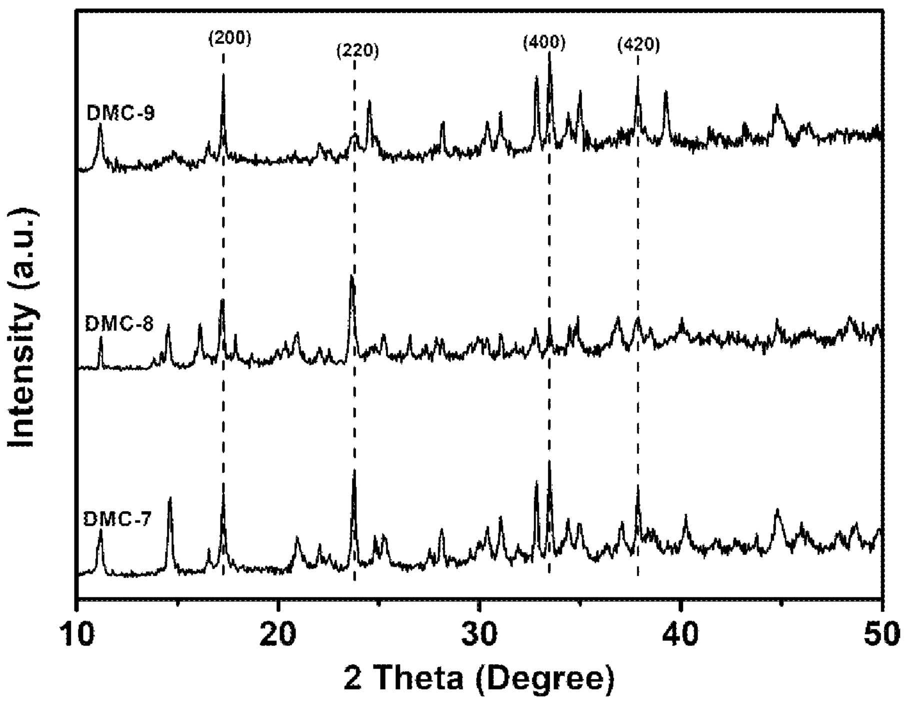
Figure 2A:
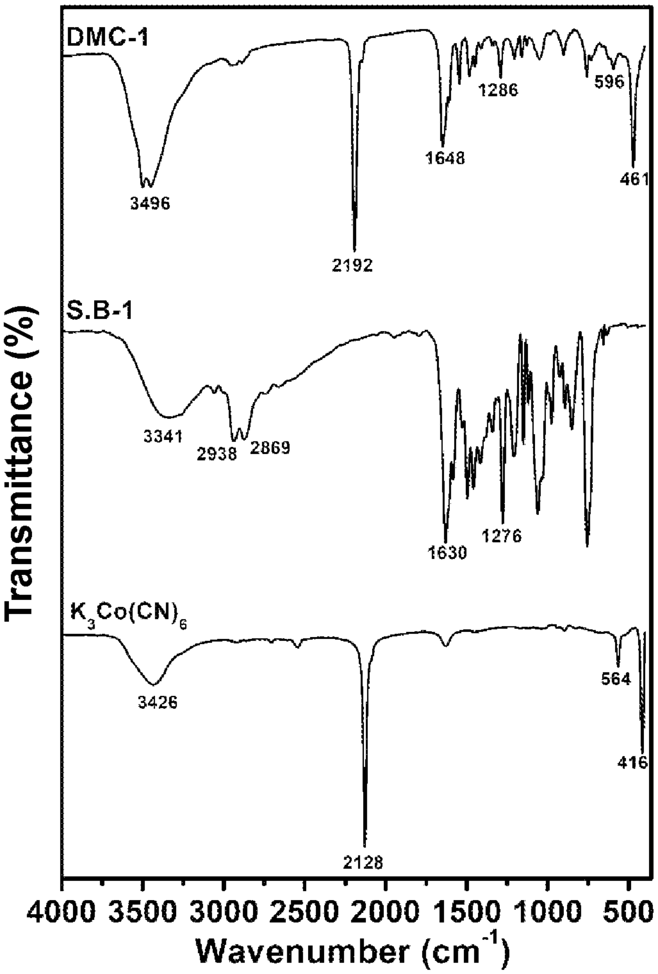
FIGS. 2A, 2B, 2C, 2D, 2E, 2F, 2G, 2H, and 2I represent the FTIR spectra of the synthesized DMC catalysts (DMC-1 to DMC-9).
Figure 2B:
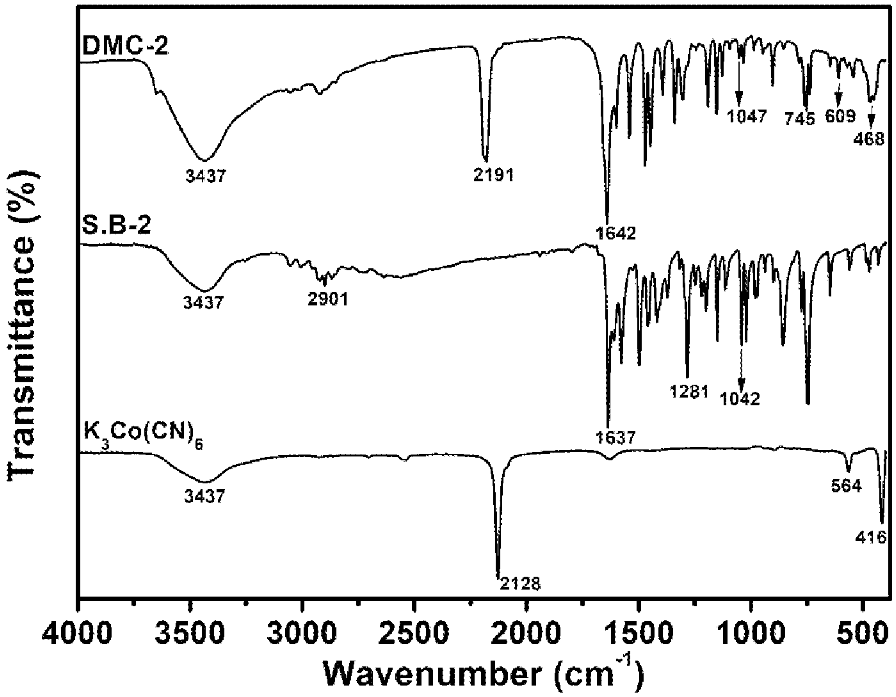
Figure 2C:
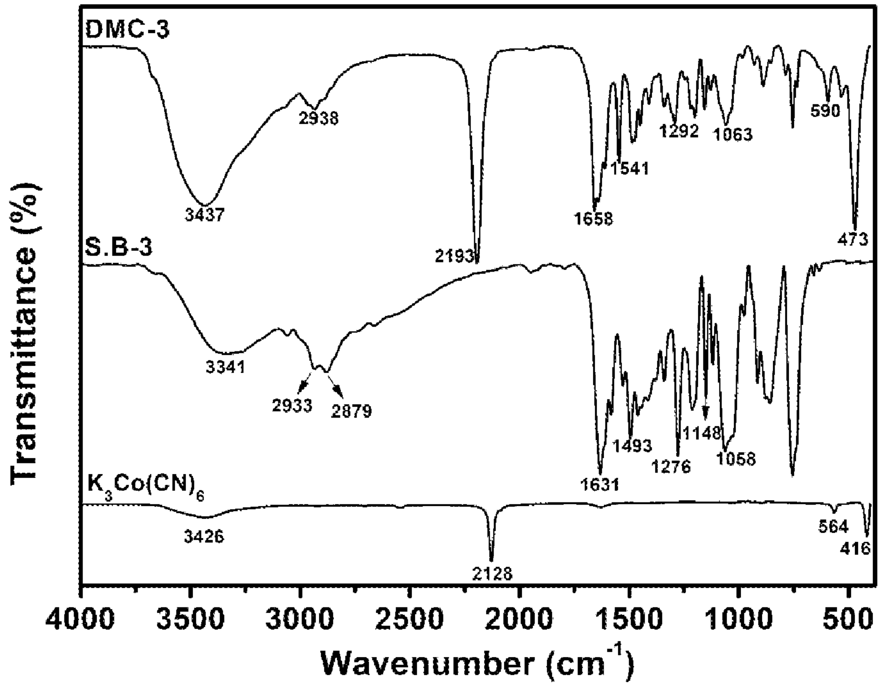
Figure 2D:
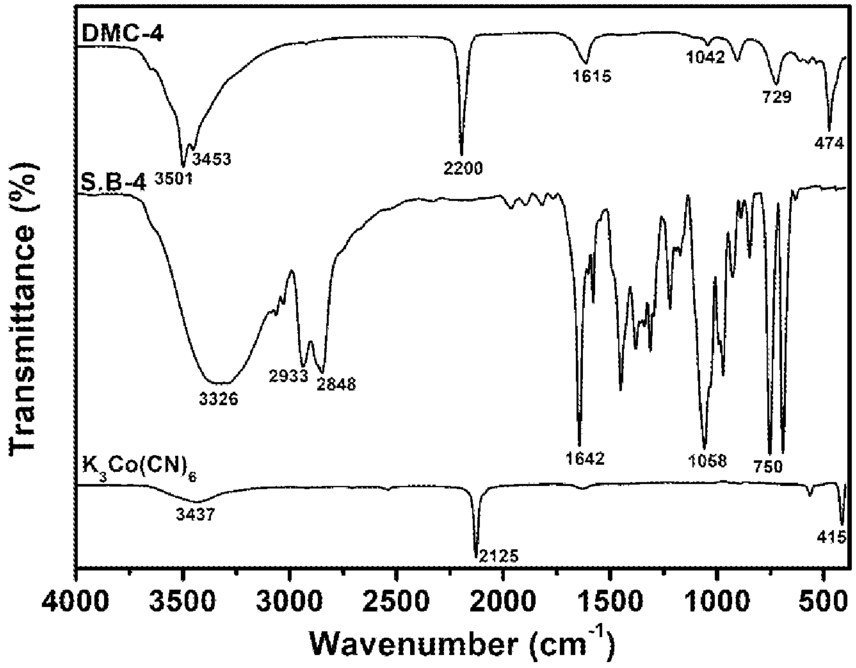
Figure 2E:
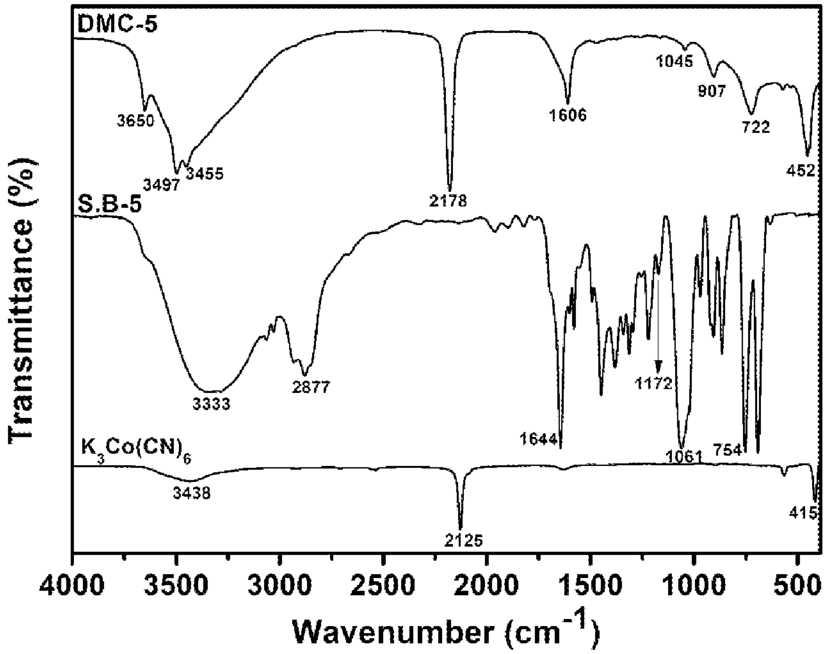
Figure 2F:
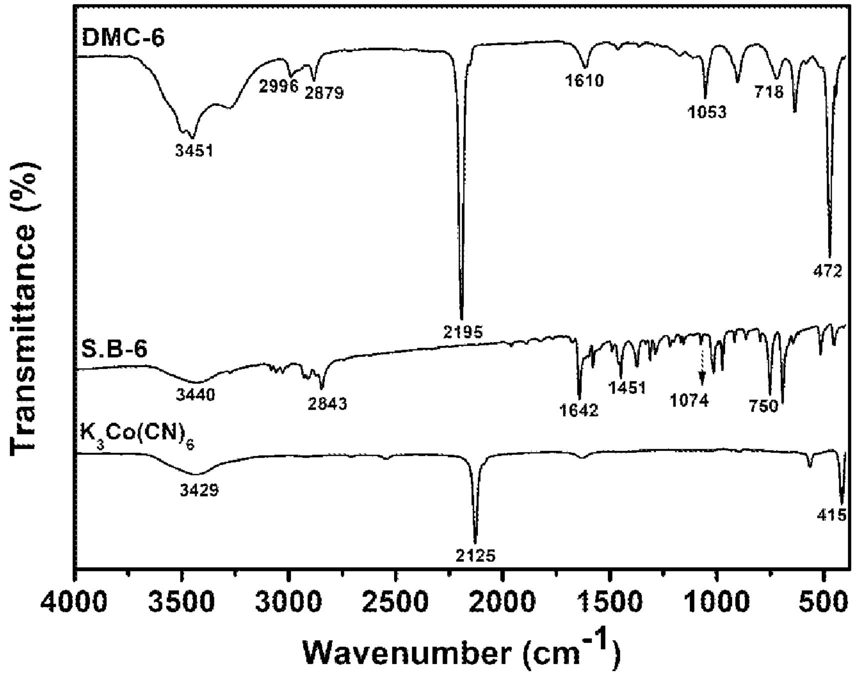
Figure 2G:
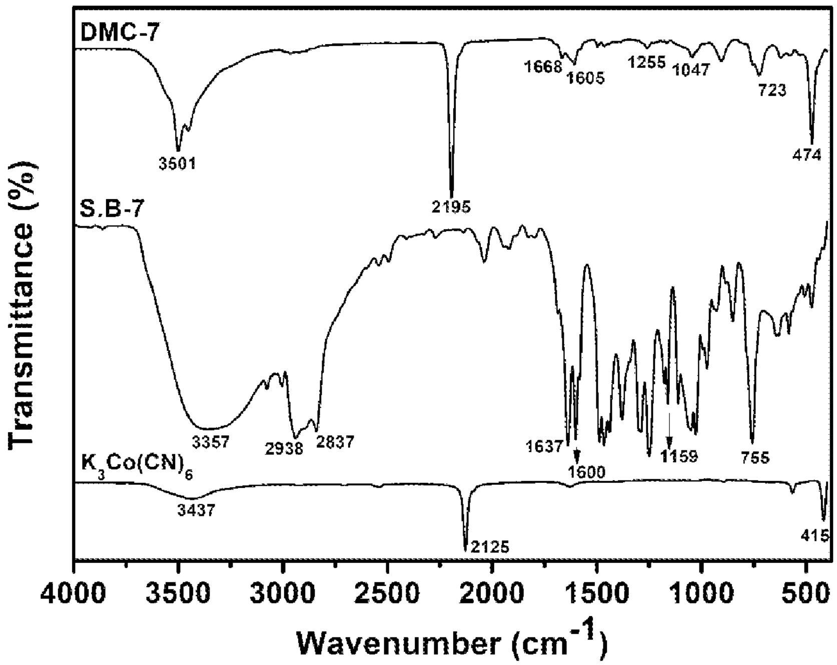
Figure 2H:
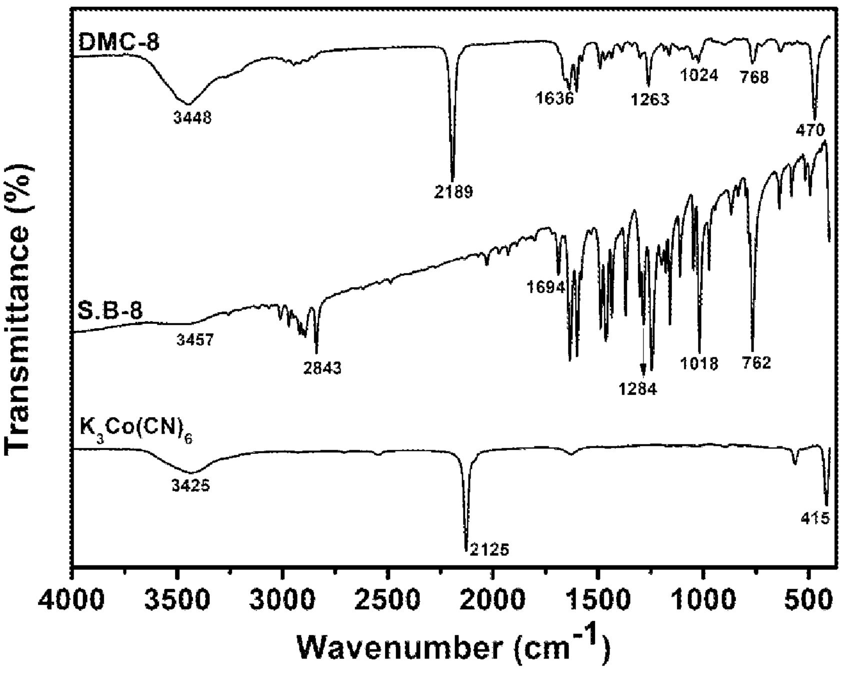
Figure 2I:
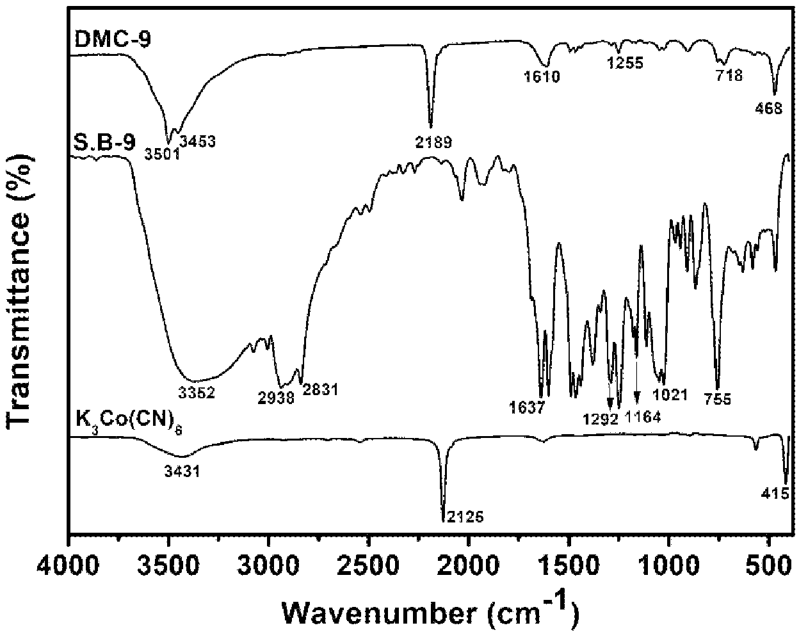
Figure 3A:
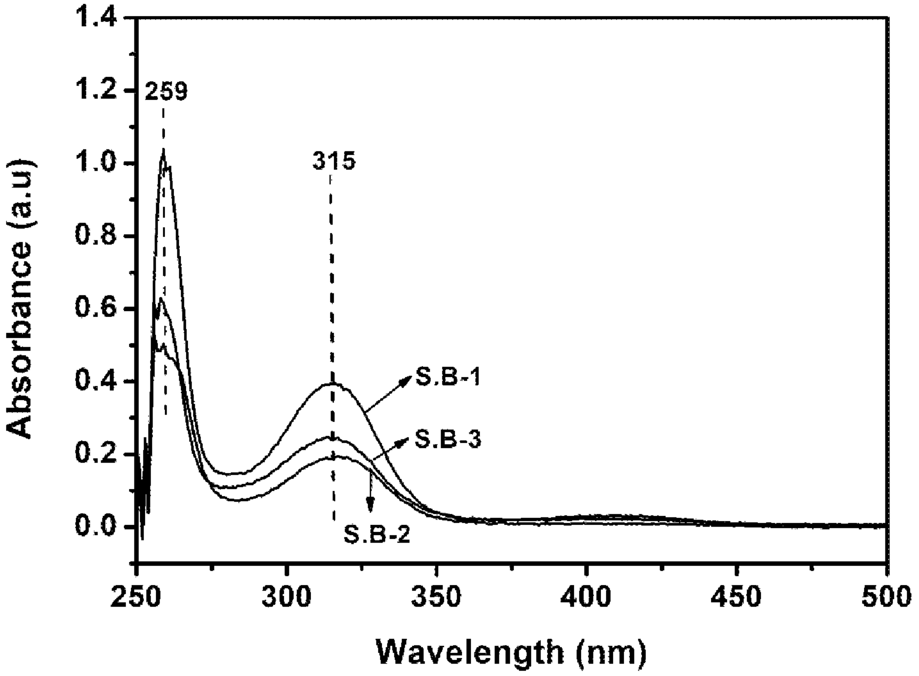
FIGS. 3A, 3B, and 3C represent the UV-Vis spectra of the Schiff bases (S.B-1 to S.B-9).
Figure 3B:
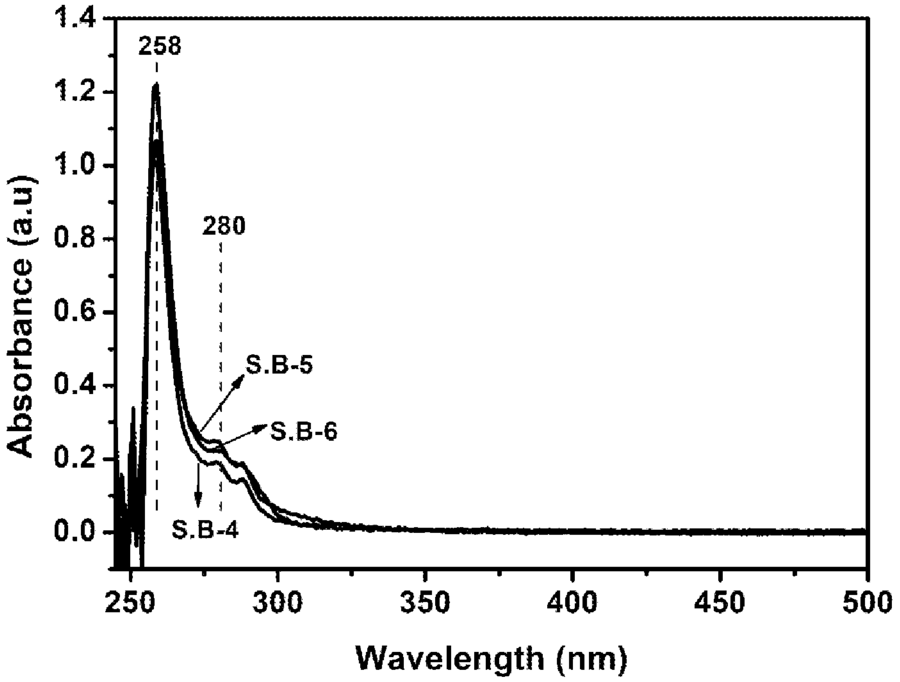
Figure 3C:
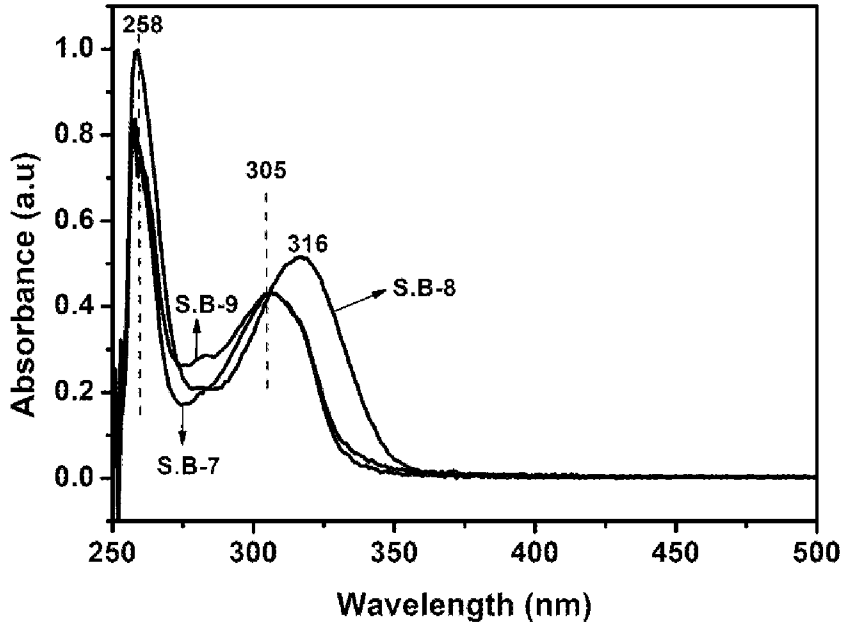
Figure 4A:
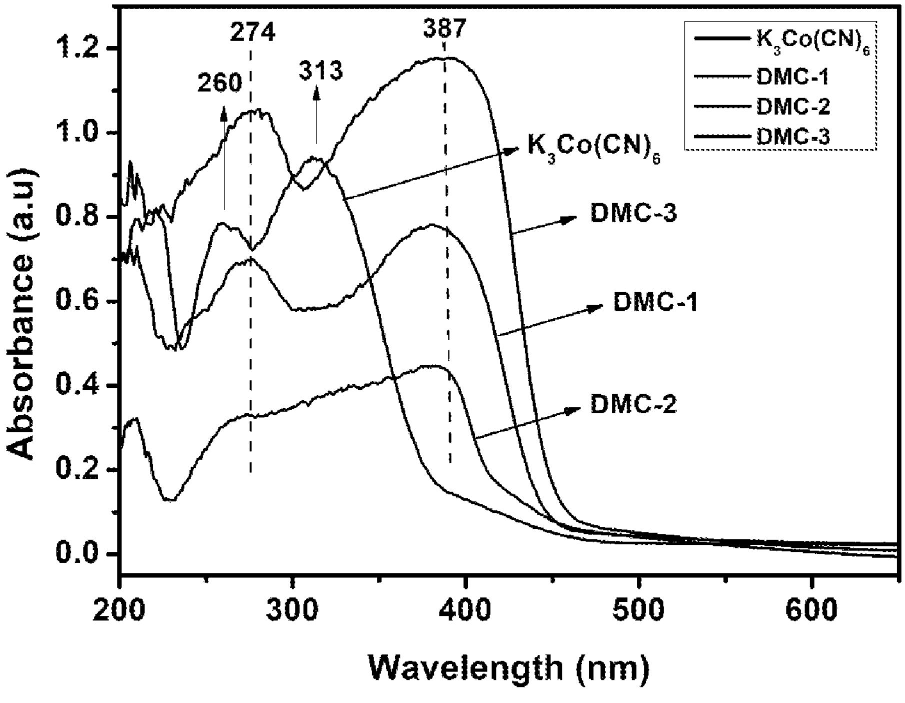
FIGS. 4A, 4B, and 4C represent the UV-Vis spectra of the synthesized DMC catalysts (DMC-1 to DMC-9).
Figure 4B:
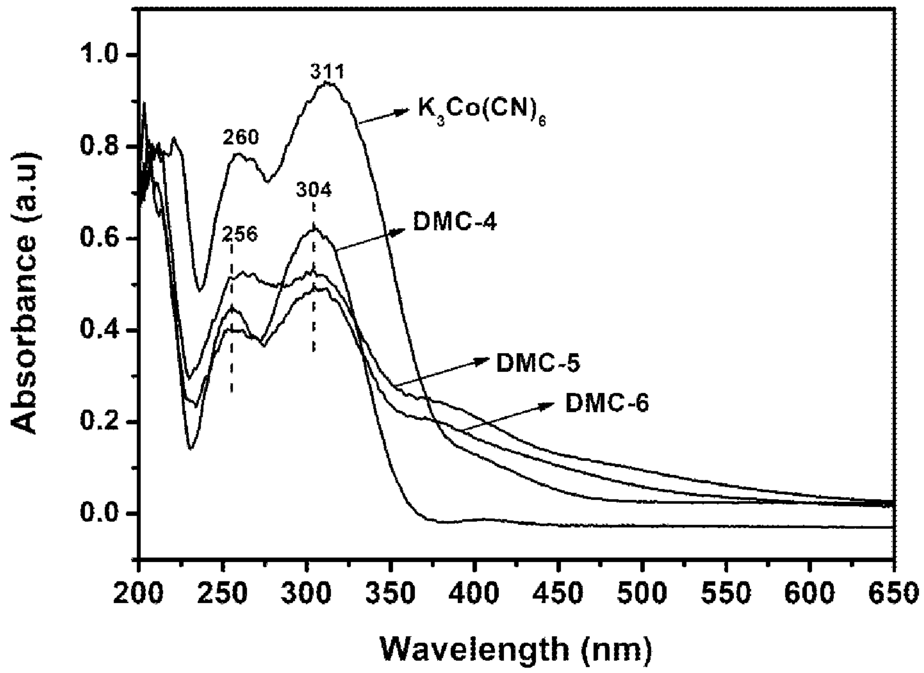
Figure 4C:
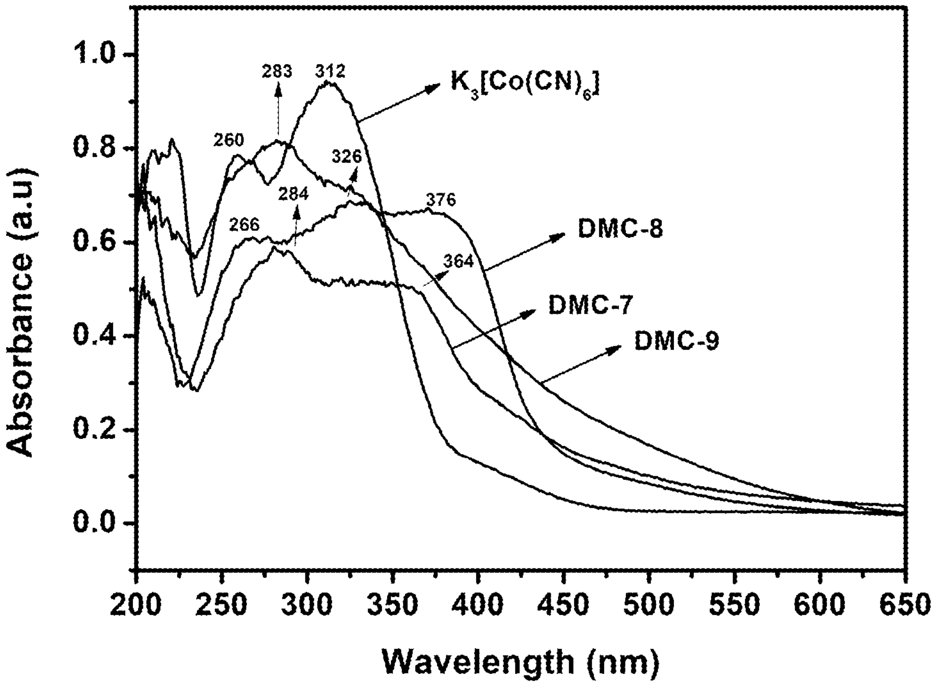
Figure 5A:
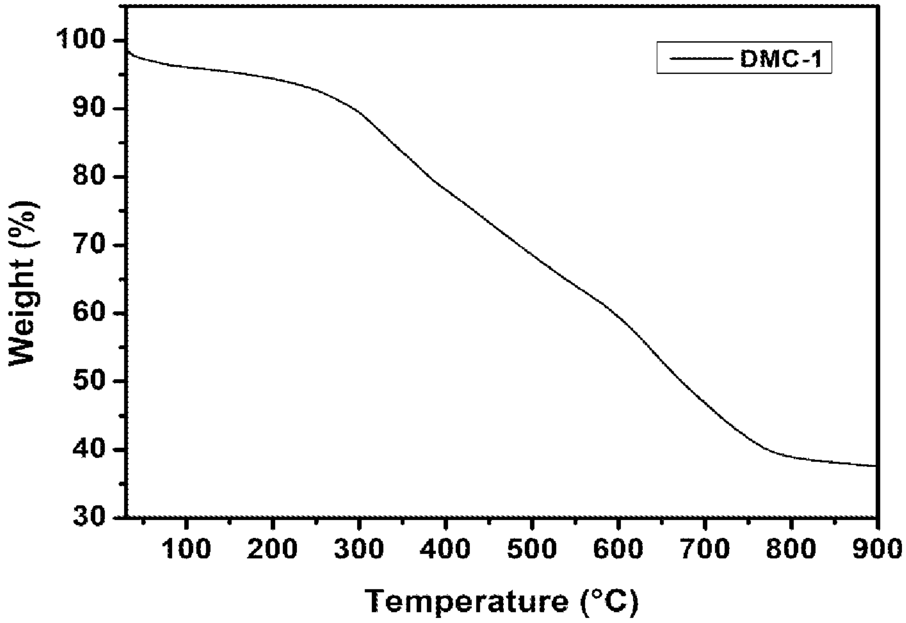
FIGS. 5A, 5B, 5C, 5D, 5E, 5F, 5G, and 5H represent TGA graphs of synthesized DMC catalysts (DMC-1 to DMC-9).
Figure 5B:
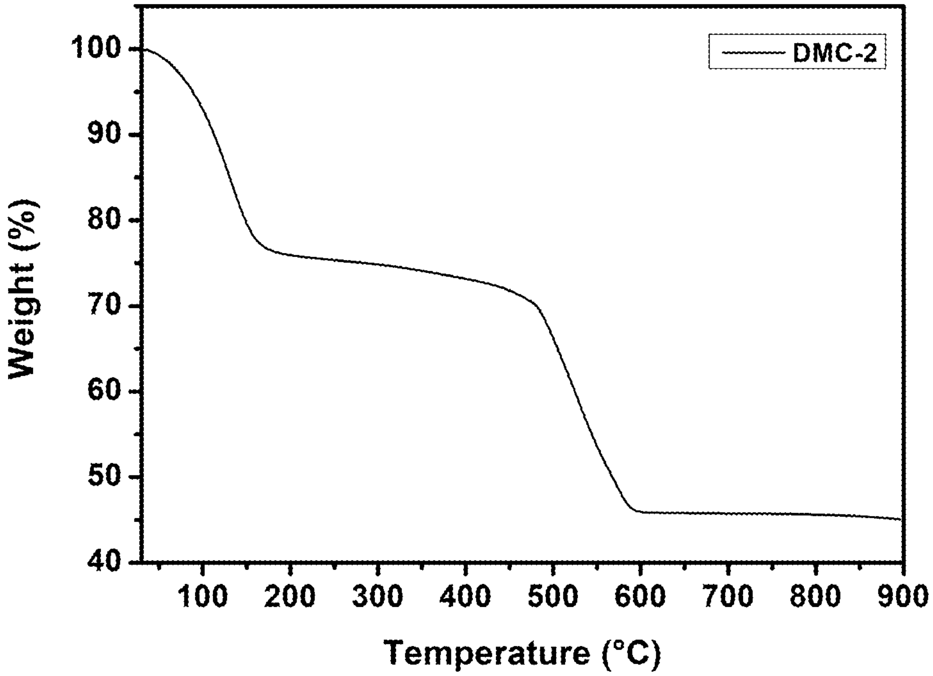
Figure 5C:
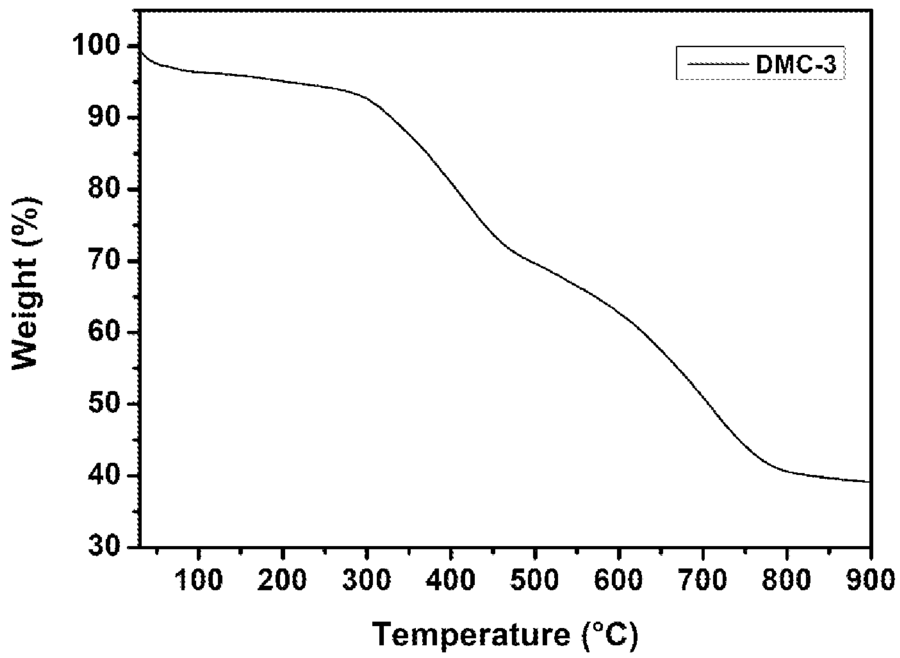
Figure 5D:
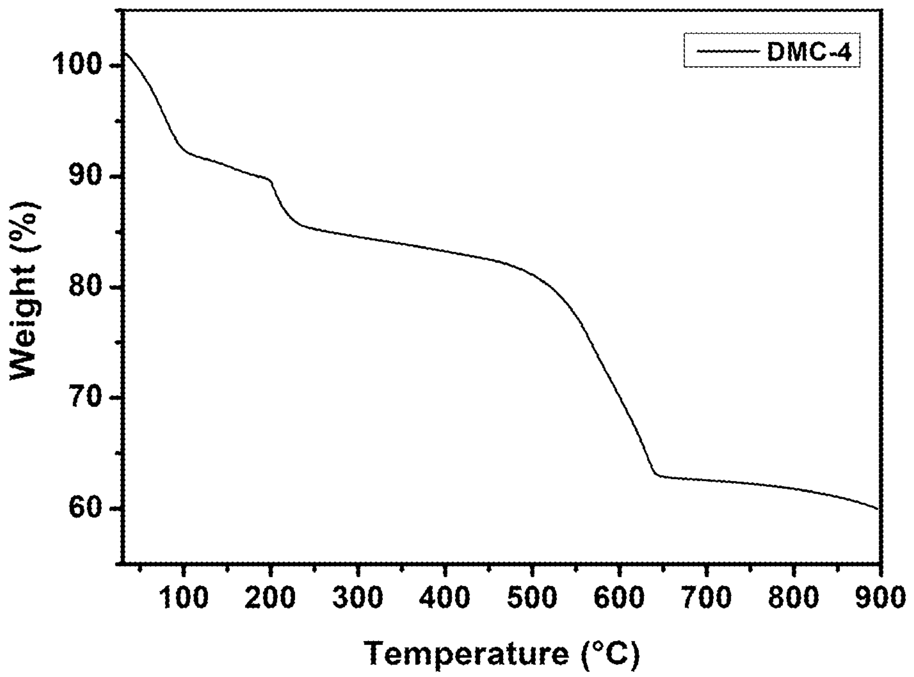
Figure 5E:
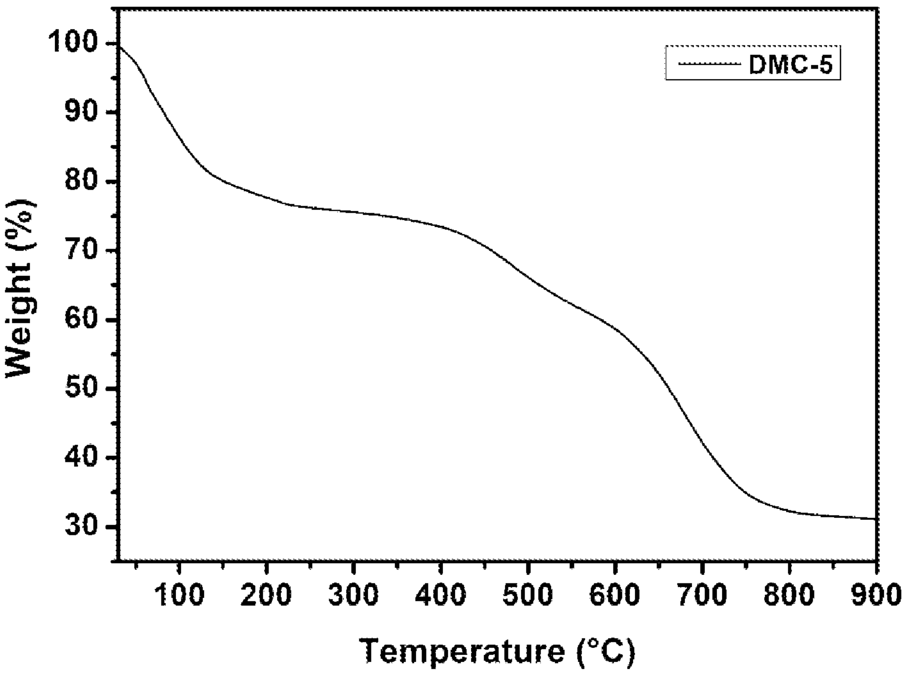
Figure 5F:
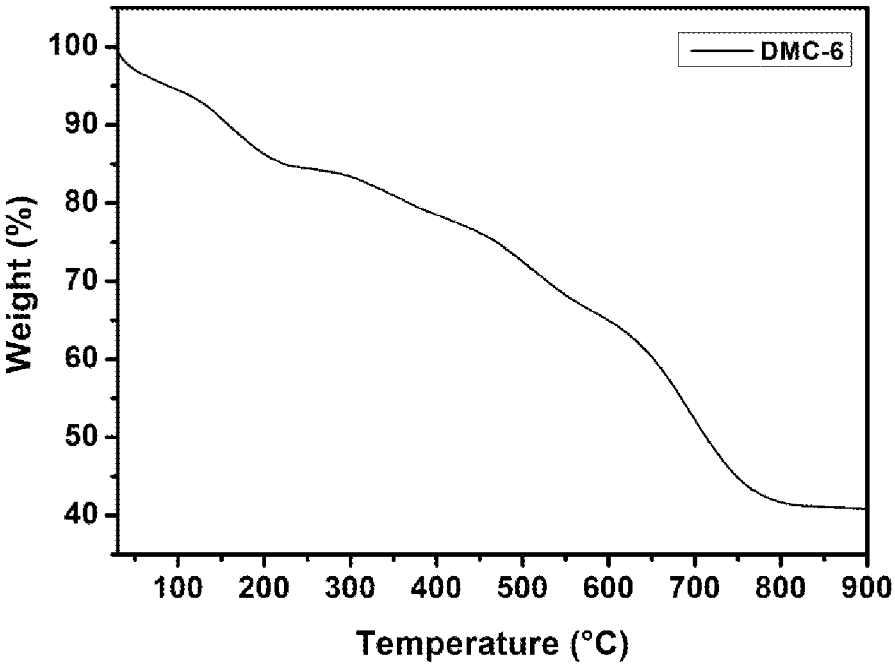
Figure 5G:
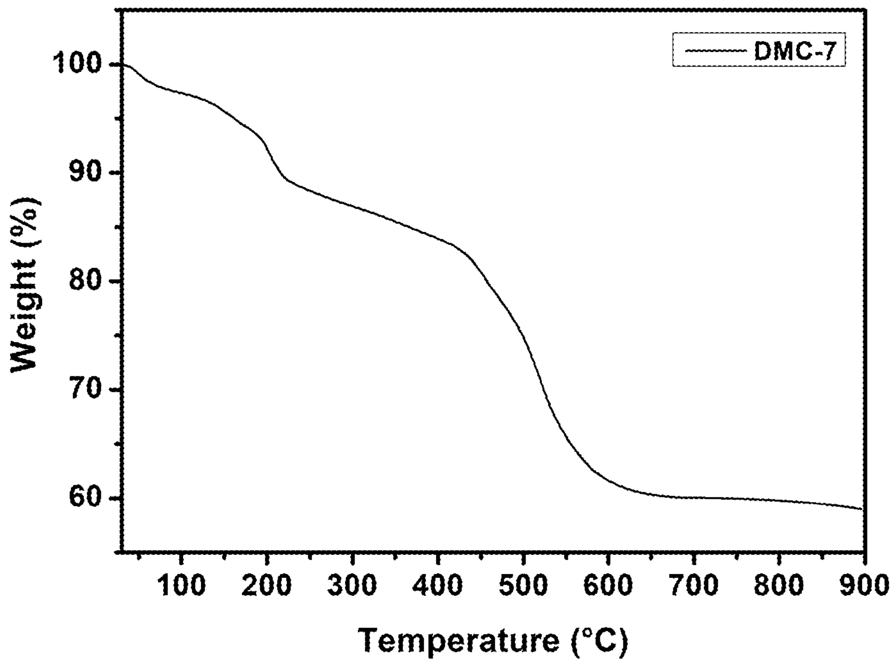
Figure 5H:
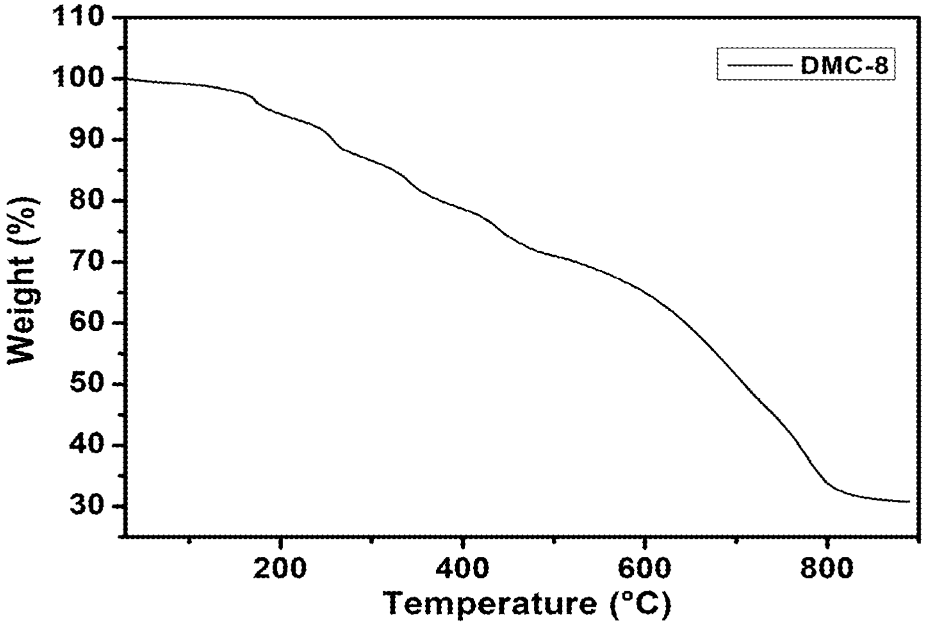
Figure 6:
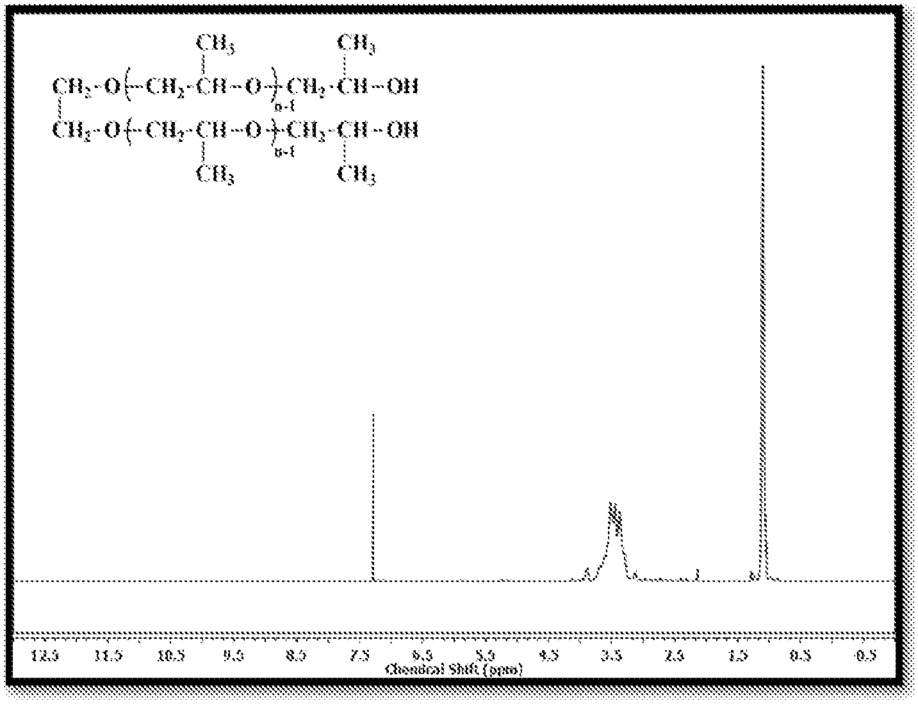
FIG. 6 represents $^1$H and DEPT-135 NMR spectra of synthesized PEPO.
Figure 6:
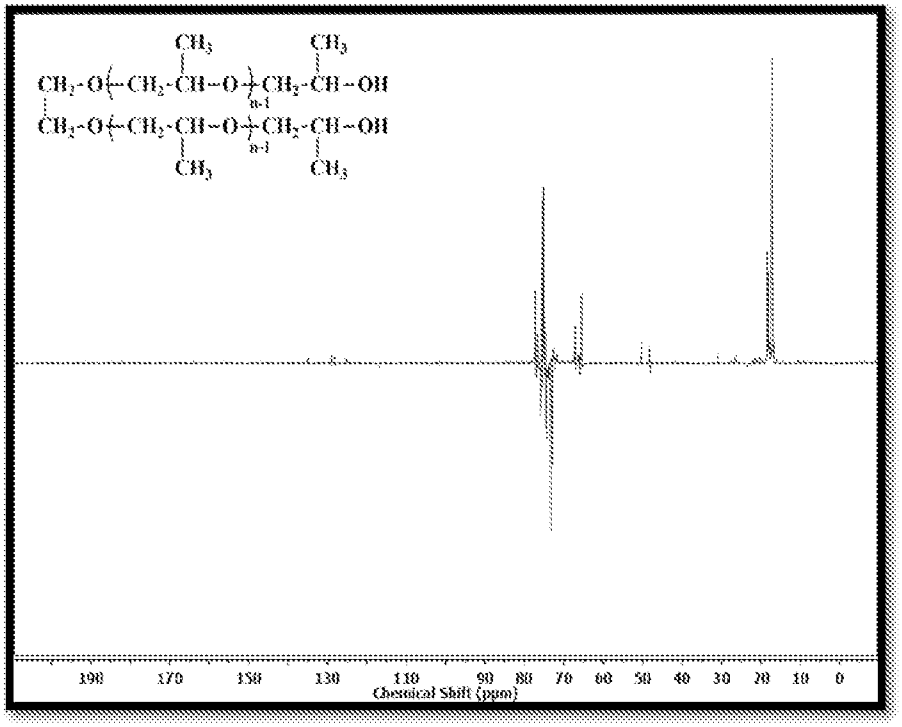
Figure 7:
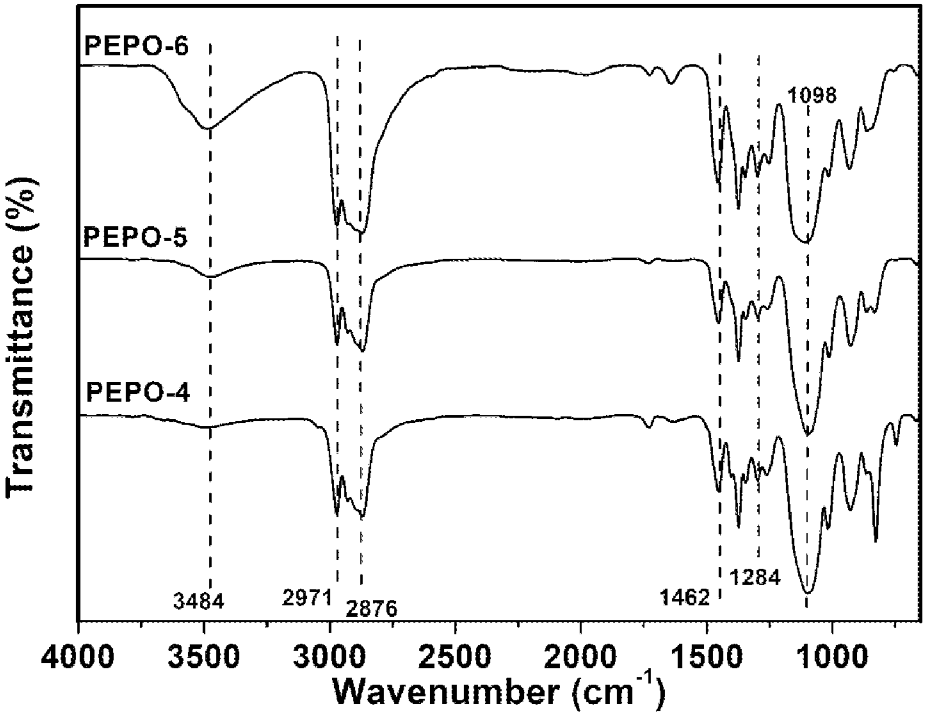
FIG. 7 represents FTIR spectra of synthesized PEPO (PEPO-4 to PEPO-6).

The synthesized catalysts were characterized by PXRD, UV-Vis, BET-Surface Area, TGA, and FTIR spectroscopy. The results are shown in Table 1, and FIGS. 1 to 10.

The effect of the various organic complexing agent (Schiff bases) in the DMC catalyst during the polymerization reaction has been scrutinized and shown in Table 2. DMC-4, DMC-5, and DMC-7 catalysts were further optimized to check the effect of other reaction parameters [catalyst amount, time, temperature, pressure, monomer to initiator (M/I) ratio, and PO injection interval time] for epoxide polymerization. Therefore, the catalyst amount was varied from 0.007 g to 0.1 g, reaction time from 12 h to 36 h, reaction temperature from RT to 150° C., and M/I ratio from 20 to 4400 to check their effects on ROP of PO and results are shown in Tables 3, 4, and 5.

TABLE 1

PXRD and BET Surface area of DMC catalysts

| Catalyst | DMC Catalyst Characterization | | | | | |
|---|---|---|---|---|---|---|
| | X-Ray Diffraction Pattern (2 theta) | | | | | BET Surface Area ($m^2/g$) |
| DMC-1 | 17.2 | 20.9 | 23.5 | 34.9 | 39.2 | 8.8 |
| DMC-2 | 17.1 | 20.9 | 24.4 | 34.8 | 39.2 | 234.4 |
| DMC-3 | 17.1 | 19.0 | 24.0 | 34.8 | 38.6 | 18.8 |
| DMC-4 | 17.2 | 21.0 | 23.7 | 34.9 | 39.2 | 214.5 |
| DMC-5 | 16.5 | 20.9 | 23.0 | 35.2 | 39.7 | 418.8 |
| DMC-6 | 17.2 | 21.0 | 23.7 | 34.9 | 38.6 | 297.3 |
| DMC-7 | 17.2 | 21.0 | 23.8 | 33.4 | 37.8 | 239.7 |
| DMC-8 | 17.2 | 21.0 | 23.8 | 33.4 | 37.8 | 4.9 |
| DMC-9 | 17.2 | 21.0 | 23.8 | 33.4 | 37.8 | 204.7 |

Example 19

This example illustrates the synthesis of PEPO, wherein PEG-2000 (2000 $M_w$) was used as an initiator using zinc hexacyanocobaltate/Schiff base (DMC-1) as a catalyst [PO: PEG-2000=1100:1]. In the synthesis of PEPO, the Teflon lined reactor was charged with 1 g of PEG-2000, 33.0 g of PO, and 0.03 g of zinc hexacyanocobaltate/Schiff base (DMC-1) catalyst. In this reaction, PEG-2000 was used as an initiator. The autoclave was purged with nitrogen ($N_2$) at 50 mL/min for 5 min to 10 min to remove dissolved gases and to create an inert atmosphere. The mixture was then heated and stirred until the reactor temperature reached 105° C. and pressurized with $N_2$ to 5 bar to carry forward the polymerization reaction. Then reaction temperature was maintained at 105° C. for 24 h with continuous stirring. The reactor pressure reached 11 to 12 bar after a few hours of the reaction, then gradually decreased with the reaction progress (time), showing the conversion of PO to PEPO. The reactor was cooled down to room temperature. A viscous liquid was obtained as a product after the reaction. The PEPO was then filtered at room temperature and dried under vacuum at 70° C. This polyol is designated as PEPO-1. The yield and key characteristics of PEPO, such as kinematic viscosity, hydroxyl number, $M_w$, and PDI, are compiled in Table 2.

Example 20

This example illustrates the synthesis of PEPO, wherein PEG-2000 (2000 $M_w$) was used as an initiator using zinc hexacyanocobaltate/Schiff base (DMC-2) as a catalyst [PO: PEG-2000=1100:1]. The procedure of example 19 was used, except DMC-2 was used as a catalyst. The product was a poly(oxypropylene)diol and designated as PEPO-2. The yield and key characteristics of PEPO, such as kinematic viscosity, hydroxyl number, $M_w$, and PDI of the PEPO-2 obtained, are compiled in Table 2.

Example 21

This example illustrates the synthesis of PEPO, wherein PEG-2000 (2000 $M_w$) was used as an initiator using zinc hexacyanocobaltate/Schiff base (DMC-3) as a catalyst [PO: PEG-2000=1100:1]. The procedure of example 19 was used, except DMC-3 was used as a catalyst. The product was a poly(oxypropylene)diol and designated as PEPO-3. The yield and key characteristics of PEPO, such as kinematic viscosity, hydroxyl number, $M_w$, and PDI of the PEPO-3 obtained, are compiled in Table 2.

Example 22

This example illustrates the synthesis of PEPO, wherein PEG-2000 (2000 $M_w$) was used as an initiator using zinc hexacyanocobaltate/Schiff base (DMC-4) as a catalyst [PO: PEG-2000=1100:1]. The procedure of example 19 was used, except DMC-4 was used as a catalyst. The product was a poly(oxypropylene)diol and designated as PEPO-4. The yield and key characteristics of PEPO, such as kinematic viscosity, hydroxyl number, $M_w$, and PDI of the PEPO-4 obtained, are compiled in Table 2.

Example 23

This example illustrates the synthesis of PEPO, wherein PEG-2000 (2000 $M_w$) was used as an initiator using zinc hexacyanocobaltate/Schiff base (DMC-5) as a catalyst [PO: PEG-2000=1100:1]. The procedure of example 19 was used, except DMC-5 was used as a catalyst. The product was a poly(oxypropylene)diol and designated as PEPO-5. The yield and key characteristics of PEPO, such as kinematic viscosity, hydroxyl number, $M_w$, and PDI of the PEPO-5 obtained, are compiled in Table 2.

Example 24

This example illustrates the synthesis of PEPO, wherein PEG-2000 (2000 $M_w$) was used as an initiator using zinc hexacyanocobaltate/Schiff base (DMC-6) as a catalyst [PO: PEG-2000=1100:1]. The procedure of example 19 was used, except DMC-6 was used as a catalyst. The product was a poly(oxypropylene)diol and designated as PEPO-6. The yield and key characteristics of PEPO, such as kinematic viscosity, hydroxyl number, $M_w$, and PDI of the PEPO-6 obtained, are compiled in Table 2.

Example 25

This example illustrates the synthesis of PEPO, wherein PEG-2000 (2000 $M_w$) was used as an initiator using zinc hexacyanocobaltate/Schiff base (DMC-7) as a catalyst [PO: PEG-2000=1100:1]. The procedure of example 19 was used, except DMC-7 was used as a catalyst. The product was a poly(oxypropylene)diol and designated as PEPO-7. The yield and key characteristics of PEPO, such as kinematic viscosity, hydroxyl number, $M_w$, and PDI of the PEPO-7 obtained, are compiled in Table 2.

Example 26

This example illustrates the synthesis of PEPO, wherein PEG-2000 (2000 $M_w$) was used as an initiator using zinc hexacyanocobaltate/Schiff base (DMC-8) as a catalyst [PO: PEG-2000=1100:1]. The procedure of example 19 was used, except DMC-8 was used as a catalyst. The product was a poly(oxypropylene)diol and designated as PEPO-8. The yield and key characteristics of PEPO, such as kinematic viscosity, $M_w$, and PDI of the PEPO-8 obtained, are compiled in Table 2.

Example 27

This example illustrates the synthesis of PEPO, wherein PEG-2000 (2000 $M_w$) was used as an initiator using zinc hexacyanocobaltate/Schiff base (DMC-9) as a catalyst [PO: PEG-2000=1100:1]. The procedure of example 19 was used, except DMC-9 (SB-9) was used as a catalyst. The product was a poly(oxypropylene)diol and designated as PEPO-9. The yield and key characteristics of PEPO, such as kinematic viscosity, hydroxyl number, $M_w$, and PDI of the PEPO-9 obtained, are compiled in Table 2.

Example 28

This example illustrates the effect of EO/PO copolymer Diol (3000 $M_w$) as an initiator on the ROP of PO for the synthesis of PEPO using zinc hexacyanocobaltate/Schiff base (DMC-7) as a catalyst. The procedure of example 19 was followed except EO/PO copolymer Diol (PO:EO/PO copolymer Diol=2200:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-34. The yield and key characteristics of PEPO such as kinematic viscosity, hydroxyl number, $M_w$, and PDI of the synthesized PEPO-34 are compiled in Table 4.

Example 29

This example illustrates the effect of PEG-400 (400 $M_w$) as an initiator on the ROP of PO for the synthesis of PEPO using zinc hexacyanocobaltate/Schiff base (DMC-7) as a catalyst. The procedure of example 19 was followed except PEG-400 (PO:PEG-400=1100:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-35. The yield and key characteristics of PEPO such as kinematic viscosity, hydroxyl number, $M_w$, and PDI of the synthesized PEPO-35 are compiled in Table 4.

Example 30

This example illustrates the effect of PEG-200 (200 $M_w$) as an initiator on the ROP of PO for the synthesis of PEPO using zinc hexacyanocobaltate/Schiff base (DMC-7) as a catalyst. The procedure of example 19 was followed except PEG-200 (PO:PEG-200=1100:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-36. The yield and key characteristics of PEPO, such as kinematic viscosity, hydroxyl number, $M_w$, and PDI of the synthesized PEPO-36, are compiled in Table 4.

Example 31

This example illustrates the effect of DPG (134.17 $M_w$) as an initiator on the ROP of PO for the synthesis of PEPO using zinc hexacyanocobaltate/Schiff base (DMC-7) as a catalyst. The procedure of example 19 was followed except PEG-200 (PO:DPG=22:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-37. The yield and key characteristics of PEPO, such as kinematic viscosity, hydroxyl number, $M_w$, and PDI of the synthesized PEPO-37, are compiled in Table 4.

Example 32

This example illustrates the effect of NPG (104.1 $M_w$) as an initiator on the ROP of PO for the synthesis of PEPO using zinc hexacyanocobaltate/Schiff base (DMC-7) as a catalyst. The procedure of example 19 was followed except NPG (PO:NPG=22:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-38. The yield and key characteristics of PEPO, such as kinematic viscosity, hydroxyl number, $M_w$, and PDI of the synthesized PEPO-38, are compiled in Table 4.

Example 33

This example illustrates the effect of 1,3-BD (90.1 $M_w$) as an initiator on the ROP of PO for the synthesis of PEPO using zinc hexacyanocobaltate/Schiff base (DMC-7) as a catalyst. The procedure of example 19 was followed except 1,3-BD (PO:1,3-BD=22:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-39. The yield and key characteristics of PEPO, such as kinematic viscosity, hydroxyl number, $M_w$, and PDI of the synthesized PEPO-39, are compiled in Table 4.

Example 34

This example illustrates the effect of 1,4-BD (90.1 $M_w$) as an initiator on the ROP of PO for the synthesis of PEPO using zinc hexacyanocobaltate/Schiff base (DMC-7) as a catalyst. The procedure of example 19 was followed except 1,4-BD (PO:1,4-BD=22:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-40. The yield and key characteristics of PEPO such as kinematic viscosity, hydroxyl number, $M_w$, and PDI of the synthesized PEPO-40 are compiled in Table 4.

Example 35

This example illustrates the effect of Glycerol (92.0 $M_w$) as an initiator on the ROP of PO for the synthesis of PEPO using zinc hexacyanocobaltate/Schiff base (DMC-7) as a catalyst. The procedure of example 19 was followed except glycerol (PO:Glycerol=22:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-41. The yield and key characteristics of PEPO, such as kinematic viscosity, hydroxyl number, $M_w$, and PDI of the synthesized PEPO-41, are compiled in Table 4.

Example 36

This example illustrates the effect of EG (62.0 $M_w$) as an initiator on the ROP of PO for the synthesis of PEPO using zinc hexacyanocobaltate/Schiff base (DMC-7) as a catalyst. The procedure of example 19 was followed except EG (PO:EG=22:1) was used as an initiator using DMC-7 as a catalyst while keeping other reaction parameters constant (Catalyst amount=0.05 g, Temperature=105° C., Pressure=5 bar, Time=24 h). The product was a poly(oxypropylene)diol and designated as PEPO-42. The yield and key characteristics of PEPO, such as kinematic viscosity, hydroxyl number, $M_w$, and PDI of the synthesized PEPO-42, are compiled in Table 4.

Example 37

The example illustrates the effect of monomer to initiator (M/I) ratio using zinc hexacyanocobaltate/Schiff base (DMC-4, DMC-5, and DMC-7) as catalysts. The procedure of the example 25 was used except PO:PEG-2000 ratio from 900 to 1400 was used using DMC-4 as a catalyst while keeping other reaction parameters constant (Catalyst: Feed=0.00021, Temperature=105° C., Pressure=5 bar, Time=24 h). The product was a poly(oxypropylene)diol and designated as PEPO-13 and PEPO-14. For DMC-5 as a catalyst, PO:PEG-2000 ratio was varied from 2200 to 4400 while keeping other reaction parameters constant (Catalyst: Feed=0.0007, Temperature=105° C., Pressure=5 bar, Time=24 h), the results of which are mentioned in Table 4 (PEPO-28 and PEPO-29). Also, for external liquid injectable reactions, this ratio was varied from 80 to 120 using DMC-7 as a catalyst, and their respective products have designation ranging from PEPO-43 to PEPO-45. The yield and key characteristics of PEPO, such as kinematic viscosity, hydroxyl number, $M_w$, and PDI of the synthesized PEPO, are compiled in Tables 3 and 5.

Example 38

The example illustrates the effect of external liquid injection on the ROP of PO for the synthesis of PEPO using DMC-7 as a catalyst and PEG-600 as an initiator. In preparation of PEPO, 2 g of PO, 3 g of PEG-600, and 0.007 g of DMC-7 catalyst were taken in a Teflon lined reactor. $N_2$ gas was purged at 50 mL/min for 5-10 min to displace/eliminate gases present in the vessel to inertize the reactor. Thereafter, the autoclave was heated to 105° C. at 1 bar until gradual pressure rise was observed in the autoclave. Later, a pressure drop was observed during 1.5 hours to 2 hours of reaction, which is pertinent to the catalyst activation. The remaining PO was added to the autoclave using an external high-pressure liquid injector and kept the reaction at 105° C. until constant pressure was observed. The product was then cooled, recovered, and designated PEPO-43 to PEPO-45, with hydroxyl numbers ranging from 7.5 to 17.2 mg KOH/g. The yield and key characteristics of PEPO, such as kinematic viscosity, hydroxyl number, $M_w$, and PDI of the synthesized PEPO, are compiled in Table 5.

TABLE 2

Effect of various DMC catalysts on the production of PEPO (Catalysts = DMC-1, DMC-2, DMC-3, DMC-4, DMC-5, DMC-6, DMC-7, DMC-8, and DMC-9), Initiator = PEG-2000)

| PEPO | Catalyst | Yield (%) | Kinematic Viscosity ($mm^2$/s) @ 40° C. | $M_w$ (g/mol) | $M_n$ (g/mol) | PDI | Hydroxyl number (mg KOH/g) |
|---|---|---|---|---|---|---|---|
| PEPO-1 | DMC-1 | 89.9 | Waxy Product | 59519 | 36020 | 1.65 | 22.1 |
| PEPO-2 | DMC-2 | 36.4 | Waxy Product | 37606 | 20012 | 1.87 | 40.1 |
| PEPO-3 | DMC-3 | 82.8 | Waxy Product | 6530 | 3847 | 1.69 | 21.8 |
| PEPO-4 | DMC-4 | 88.2 | Waxy Product | 65067 | 39180 | 1.68 | 23.4 |
| PEPO-5 | DMC-5 | 71.4 | Waxy Product | 5732 | 3221 | 1.77 | 29.1 |
| PEPO-6 | DMC-6 | 67.2 | Waxy Product | 36196 | 12192 | 2.82 | 31.1 |
| PEPO-7 | DMC-7 | 98.1 | Waxy Product | 7403 | 5050 | 1.46 | 11.2 |
| PEPO-8 | DMC-8 | 65.1 | Waxy Product | 141224 | 137333 | 1.02 | 29.1 |
| PEPO-9 | DMC-9 | 53.1 | Waxy Product | 4861 | 2666 | 1.82 | 35.2 |

Reaction Conditions: PO: PEG-2000 = 1100:1, Catalyst: Feed = 0.0009, $ZnCl_2$:$K_3[Co(CN)_6]$ = 44:1, Temperature = 105° C., Time = 24 h, Pressure = 5 bar.

TABLE 3

Effect of catalyst amount, M/I ratio, time, temperature, and pressure on the production of PEPO (Catalyst = DMC-4 and DMC-5, Initiator = PEG-2000); WP-waxy Product

| PEPO | PO PEG-2000 Ratio | Catalyst | Catalyst Feed Ratio | Temp. (° C.) | Press. (bar) | Time (h) | Yield (%) | Kinematic Viscosity ($mm^2$/s) @ 40° C. | $M_w$ (g/mol) | $M_n$ (g/mol) | PDI | Hydroxyl number (mg KOH/g) |
|---|---|---|---|---|---|---|---|---|---|---|---|---|
| PEPO-10 | 1100:1 | DMC-4 | 0.0009 | 105 | 5 | 24 | 81.2 | WP | 62067 | 38180 | 1.62 | 28.6 |
| PEPO-11 | 1100:1 | DMC-4 | 0.00045 | 105 | 5 | 24 | 51.0 | WP | 68249 | 39582 | 1.72 | 23.4 |
| PEPO-12 | 1100:1 | DMC-4 | 0.00021 | 105 | 5 | 24 | 31.7 | Less amount to determine viscosity | 71256 | 33611 | 2.12 | 32.1 |
| PEPO-13 | 900:1 | DMC-4 | 0.00021 | 105 | 5 | 24 | 34.9 | WP | 58067 | 30180 | 1.92 | 35.4 |
| PEPO-14 | 1400:1 | DMC-4 | 0.00021 | 105 | 5 | 24 | 27.6 | WP | 72248 | 25350 | 2.85 | 38.2 |
| PEPO-15 | 1100:1 | DMC-4 | 0.0009 | 120 | 5 | 24 | 91.5 | WP | 66067 | 40180 | 1.64 | 19.5 |
| PEPO-16 | 1100:1 | DMC-4 | 0.0009 | 130 | 5 | 24 | 92.4 | WP | 69067 | 42195 | 1.63 | 17.4 |
| PEPO-17 | 1100:1 | DMC-4 | 0.0009 | 150 | 5 | 24 | 94.0 | WP | 71548 | 44582 | 1.60 | 15.1 |

TABLE 3-continued

Effect of catalyst amount, M/I ratio, time, temperature, and pressure on the production of PEPO (Catalyst = DMC-4 and DMC-5, Initiator = PEG-2000); WP-waxy Product

| PEPO | PO PEG-2000 Ratio | Catalyst | Catalyst Feed Ratio | Temp. (° C.) | Press. (bar) | Time (h) | Yield (%) | Kinematic Viscosity ($mm^2/s$) @ 40° C. | $M_w$ (g/mol) | $M_n$ (g/mol) | PDI | Hydroxyl number (mg KOH/g) |
|---|---|---|---|---|---|---|---|---|---|---|---|---|
| PEPO-18 | 1100:1 | DMC-4 | 0.0009 | 105 | 5 | 18 | 70.2 | WP | 63149 | 42248 | 1.49 | 24.5 |
| PEPO-19 | 1100:1 | DMC-4 | 0.0009 | 105 | 5 | 12 | 61.7 | WP | 59158 | 42568 | 1.38 | 29.4 |
| PEPO-20 | 1100:1 | DMC-4 | 0.0009 | 105 | 2.5 | 24 | 81.5 | WP | 61061 | 29180 | 2.09 | 18.2 |
| PEPO-21 | 1100:1 | DMC-4 | 0.0009 | 105 | 10 | 24 | 89.1 | WP | 67123 | 38170 | 1.75 | 12.4 |
| PEPO-22 | 1100:1 | DMC-4 | 0.0009 | 105 | 20 | 24 | 90.2 | WP | 72451 | 40475 | 1.79 | 11.3 |
| PEPO-23 | 1100:1 | DMC-5 | 0.00045 | 105 | 5 | 24 | 35.0 | WP | 59214 | 29313 | 2.02 | 43.1 |
| PEPO-24 | 1100:1 | DMC-5 | 0.00045 | 105 | 5 | 24 | 35.4 | WP | 47606 | 30011 | 1.58 | 42.7 |
| PEPO-25 | 1100:1 | DMC-5 | 0.0007 | 105 | 5 | 24 | 59.0 | WP | 6442 | 3977 | 1.61 | 14.0 |
| PEPO-26 | 1100:1 | DMC-5 | 0.0007 | 105 | 2.5 | 24 | 56.6 | WP | 60148 | 33180 | 1.81 | 16.8 |
| PEPO-27 | 1100:1 | DMC-5 | 0.0007 | 105 | 5 | 36 | 60.1 | WP | 62157 | 32014 | 1.94 | 13.2 |
| PEPO-28 | 2200:1 | DMC-5 | 0.0007 | 105 | 5 | 24 | 57.8 | WP | 5827 | 2826 | 2.06 | 15.4 |
| PEPO-29 | 4400:1 | DMC-5 | 0.0007 | 105 | 5 | 24 | 4.7 | WP | 980 | 839 | 1.16 | 52.4 |
| PEPO-30 | 1100:1 | DMC-5 | 0.0007 | 105 | 5 | 18 | 45.7 | WP | 58015 | 29751 | 1.95 | 35.1 |
| PEPO-31 | 1100:1 | DMC-5 | 0.0007 | 105 | 5 | 12 | 38.2 | WP | 48286 | 29991 | 1.61 | 41.2 |
| PEPO-32 | 1100:1 | DMC-5 | 0.001 | 105 | 5 | 24 | 96.7 | WP | 46716 | 34311 | 1.36 | 18.1 |
| PEPO-33 | 1100:1 | DMC-5 | 0.001 | RT | 5 | 24 | 12.5 | Less amount to determine viscosity | 1245 | 628 | 1.98 | 48.9 |

Reaction Conditions: Initiator = PEG-2000, $ZnCl_2.K_3[Co(CN)_6]$ = 44:1

TABLE 4

Effect of different initiators [EO-PO copolymer, PEG-400, PEG-200, DPG, NPG, 1,3-BD, 1,4-BD, glycerol, EG] on the production of PEPO; LA = Less amount to determine viscosity

| PEPO | PO:Initiator | Catalyst | Catalyst Feed Ratio | Temp. (° C.) | Press. (bar) | Time (h) | Yield (%) | Viscosity ($mm^2/s$) @ 40° C. | $M_w$ (g/mol) | $M_n$ (g/mol) | PDI | Hydroxyl number (mg KOH per g) |
|---|---|---|---|---|---|---|---|---|---|---|---|---|
| PEPO-34 | PO:EO-PO copolymer polyol = 1100:1 | DMC-7 | 0.001 | 105 | 5 | 24 | 6.8 | LA | 495 | 461 | 1.07 | Less amt. to determine hydroxyl value |
| PEPO-35 | PO:PEG-400 = 1100:1 | DMC-7 | 0.001 | 105 | 5 | 24 | 80.6 | 82.2 | 1372 | 1039 | 1.32 | 37.8 |
| PEPO-36 | PO:PEG-200 = 1100:1 | DMC-7 | 0.001 | 105 | 5 | 24 | 51.4 | 14.2 | 490 | 441 | 1.11 | 41.2 |
| PEPO-37 | PO:DPG = 22:1 | DMC-7 | 0.001 | 105 | 5 | 24 | 81.2 | 31.2 | 712 | 598 | 1.19 | 59.5 |
| PEPO-38 | PO:neopentyl glycol = 22:1 | DMC-7 | 0.001 | 105 | 5 | 24 | 81.7 | 17.9 | 1215 | 1093 | 1.11 | 66.9 |
| PEPO-39 | PO:1,3-butanediol = 22:1 | DMC-7 | 0.001 | 105 | 5 | 24 | 85.7 | 21.1 | 540 | 469 | 1.15 | 67.2 |
| PEPO-40 | PO:1,4-butanediol = 22:1 | DMC-7 | 0.001 | 105 | 5 | 24 | 87.3 | 22.2 | 1254 | 1125 | 1.11 | 66.6 |
| PEPO-41 | PO:glycerol = 22:1 | DMC-7 | 0.001 | 105 | 5 | 24 | 12.6 | LA | 467 | 416 | 1.12 | 21.2 |
| PEPO-42 | PO:EG = 22:1 | DMC-7 | 0.001 | 105 | 5 | 24 | 9.2 | LA | 455 | 433 | 1.05 | 16.6 |

TABLE 5

| Effect of external PO injection on the production of PEPO | | | | | | | | | | |
|---|---|---|---|---|---|---|---|---|---|---|
| PEPO | PO PEG-600 Ratio | Catalyst | Catalyst Feed Ratio | Time (h) | Yield (%) | Viscosity ($mm^2/s$) @ 40° C. | $M_w$ (g/mol) | $M_n$ (g/mol) | PDI | Hydroxyl number (mg KOH/g) |
| PEPO-43 | 80:1 | DMC-7 | 0.0001 | 20 | 76.7 | 737.2 | 4687 | 2849 | 1.64 | 7.5 |
| PEPO-44 | 120:1 | DMC-7 | 0.0001 | 20 | 88.8 | 8148.1 | 4798 | 2544 | 1.88 | 14.7 |
| PEPO-45 | 120:1 | DMC-7 | 0.0001 | 16 | 86.7 | 4422.2 | 5327 | 3124 | 1.70 | 17.2 |

Reaction Conditions: Temperature = 105° C., Pressure = 5 bar, $ZnCl_2$ :$K_3[Co(CN)_6]$ = 44:1

Specific Advantages:

Synthesis of zinc-cobalt based DMC catalysts $Zn_3[Co(CN)_6]_2$ at room temperature for the synthesis of PEPO.

Use of different Schiff bases including 2-(((3-hydroxypropyl)imino)methyl)phenol, 2,2'-((ethane-1,2-diylbis(azanylylidene))bis(methanylylidene))diphenol, 2-(((2-hydroxyethyl)imino)methyl)phenol, 3-(benzylideneamino)propan-1-ol, 2-(benzylideneamino)ethanol, $N^1$,$N^2$-dibenzylideneethane-1,2-diamine, 3-((2-methoxybenzylidene)amino)propan-1-ol, 2-((2-methoxybenzylidene)amino)ethanol, $N^1$,$N^2$-bis(2-methoxybenzylidene)ethane-1,2-diamine as novel organic complexing agents in DMC catalytic system.

Attaining high activity towards ROP of PO using synthesized DMC catalysts.

Use of different initiators such as EG, DPG, NPG, 1,3-BD, 1,4-BD, glycerol, polyethylene glycol (PEG) of different molecular weight including PEG-200, PEG-400, PEG-600, PEG-2000, and EO-PO copolymer polyol for PEPO synthesis. The PEPO yield is higher with high molecular weight initiators.

Acquiring PEPO at a lower dosage of DMC catalyst to eliminate/minimize its removal from PEPO.

We claim:

1. A double metal cyanide catalyst comprising:

(a) from 35 wt % to 90 wt % of a double metal cyanide complex; and (b) from 10 wt % to 65 wt % of an organic complexing agent comprising a Schiff base.

2. The catalyst of claim 1, wherein the double metal cyanide complex is selected from the group consisting of zinc(II) hexacyanocobaltate(III), zinc(II) hexacyanoferrate (II), zinc(II) hexacyanoferrate(III), cobalt(II) hexacyanoferrate(III), manganese(II) hexacyanoferrate(III), nickel(II) hexacyanoferrate(III), manganese(II) hexacyanocobaltate (III), and nickel(II) hexacyanocobaltate.

3. The catalyst of claim 1, wherein the organic complexing agent is a Schiff base selected from the group consisting of (i) 2-(((3-hydroxypropyl)imino)methyl)phenol;

(ii) 2,2'-((ethane-1,2-diylbis(azanylylidene))bis(methanylylidene))diphenol;

(iii) 2-(((2-hydroxyethyl)imino)methyl)phenol;

(iv) 3-(benzylideneamino)propan-1-ol;

(v) 2-(benzylideneamino)ethanol;

(vi) $N^1$,$N^2$-dibenzylideneethane-1,2-diamine;

(vii) 3-((2-methoxybenzylidene)amino)propan-1-ol;

(viii) 2-((2-methoxybenzylidene)amino)ethanol; and (ix) $N^1$,$N^2$-bis(2-methoxybenzylidene)ethane-1,2-diamine.

4. The catalyst of claim 1, wherein the double metal cyanide catalyst comprises a double metal cyanide complex and the Schiff base are selected from the following combinations:

(i) zinchexacyanocobaltate/2-(((3-hydroxypropyl)imino)methyl)phenol;

(ii) zinchexacyanocobaltate/2,2'-((ethane-1,2 diylbis(azanylylidene))bis(methanylylidene))diphenol;

(iii) zinchexacyanocobaltate/2-(((2-hydroxyethyl)imino)methyl)phenol;

(iv) zinchexacyanocobaltate/3-(benzylideneamino)propan-1-ol;

(v) zinchexacyanocobaltate/2-(benzylideneamino)ethanol;

(vi) zinchexacyanocobaltate/$N^1$,$N^2$-dibenzylideneethane-1,2-diamine;

(vii) zinchexacyanocobaltate/3-((2-methoxybenzylidene)amino)propan-1-ol;

(viii) zinchexacyanocobaltate/2-((2-methoxybenzylidene)amino)ethanol; and (ix) zinchexacyanocobaltate/$N^1$,$N^2$-bis(2-methoxybenzylidene)ethane-1,2-diamine.

5. A process for preparing the double metal cyanide catalyst of claim 1, the process comprising:

(a) mixing from 10 wt % to 65 wt % of the organic complexing agent with a solvent to obtain a first solution;

(b) adding the first solution to an aqueous solution of metal salts of formula $M(A)_n$, followed by homogenizing for 5 minutes to 30 minutes at 20° C. to 35° C. to obtain a second solution, wherein:

M is selected from the group consisting of Zn(II), Fe(II), Pb(II), Mo(IV), Al(III), Mn(II), V(IV), V(V), W(IV), W(VI), Co(II), Sn(II), Cu(II), Cr(III), and Ni(II);

A is an anion selected from the group consisting of halides, sulfates, hydroxides, cyanides, oxalates, isocyanates, thiocyanates, isothiocyanates, carboxylates, and nitrates; and n is from 1 to 3;

(c) adding an aqueous solution of metal cyanide salt of formula $(A^*)_xM^*(CN)_y$ to the second solution, followed by homogenizing for 30 minutes to 40 minutes to obtain a third solution, wherein:

A* is selected from an alkali metal ion or alkaline earth metal ion;

M* is selected from the group consisting of Fe(II), Fe(III), Co(II), Ir(III), Ni(II), Rh(III), Ru(II), Co(III), Cr(II), Cr(III), Mn(II), Mn(III), V(IV), and V(V);

both x and y are integers greater than or equal to 1; and the sum of the charges of x and y balances the charge of M*;

(d) adding a polyethylene glycol (PEG) and a solvent to the third solution, followed by homogenizing for 5 minutes to 30 minutes and centrifuging at 6000 rpm for 10 minutes to obtain a solid cake; and (e) mixing the solid cake with PEG in a solvent and homogenizing this mixture for 30 minutes to 40 minutes, then washing and drying to obtain the double metal cyanide catalyst.

6. The process of claim 5, wherein the PEG has a molecular weight from 200 g/mol to 400 g/mol.

7. The process of claim 5, wherein the solvent in (d) and (e) is selected from tetrahydrofuran or acetonitrile.

8. A single-step process for a ring opening polymerization of propylene oxide with initiators to produce polyether polyols using the double metal cyanide catalyst of claim 1, the single step process comprising:

(a) charging the double metal cyanide catalyst, an initiator, and propylene oxide in a Teflon-lined reactor and conducting the ring-opening polymerization at a temperature of 8° C. to 150° C., a pressure from 1 bar to 20 bar, and for a time period from 12 hours to 36 hours to obtain a reaction mixture;

(b) cooling the reactor to 8° C. to 40° C.; and (c) separating unreacted propylene oxide from the polyether polyols, followed by vacuum drying at 40° C. to 70° C. to obtain from 4.7 wt % to 98.1 wt % polyether polyols.

9. The single-step process of claim 8, wherein the initiator has a molecular weight from 62 g/mol to 3000 g/mol.

10. The single-step process of claim 8, wherein a ratio of propylene oxide to the initiator is from 22:1 to 4400:1.

11. The single-step process of claim 8, wherein the initiator is selected from the group consisting of ethylene glycol, dipropylene glycol, neopentyl glycol, 1,3-butanediol, 1,4-butanediol, glycerol, PEG, and ethylene oxide-propylene oxide copolymer polyol.

12. The single-step process of claim 8, wherein the polyether polyols have molecular weights from 450 g/mol to 141,224 g/mol, a polydispersity index (PDI) of less than 1.5, and viscosities from 13.1 $mm^2/s$ to 20,524 $mm^2/s$.

* * * * *